US010764124B1

United States Patent
Ben Ari et al.

(10) Patent No.: US 10,764,124 B1
(45) Date of Patent: Sep. 1, 2020

(54) INTELLIGENT EXPORT AND IMPORT OF SERVICE REPRESENTATIONS

(71) Applicant: ServiceNow, Inc., Santa Clara, CA (US)

(72) Inventors: Tal Ben Ari, Ness Ziyyona (IL); Alon Mansour, Ramat Gan (IL); Leonid Suslov, Tel Aviv (IL); Rotem Steuer, Modin (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/402,000

(22) Filed: May 2, 2019

(51) Int. Cl.
*H04L 12/24* (2006.01)
*H04L 29/08* (2006.01)
*H04L 29/06* (2006.01)
*G06F 16/23* (2019.01)
*H04N 21/21* (2011.01)
*G06F 16/27* (2019.01)

(52) U.S. Cl.
CPC .......... *H04L 41/08* (2013.01); *G06F 16/2365* (2019.01); *G06F 16/27* (2019.01); *H04L 67/16* (2013.01); *H04L 67/40* (2013.01); *H04N 21/21* (2013.01)

(58) Field of Classification Search
CPC ......... H04L 41/08; H04L 67/16; H04L 67/40; H04N 21/21; G06F 16/27; G06F 16/2365
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,816,898 B1 | 11/2004 | Scarpelli |
| 6,895,586 B1 | 5/2005 | Brasher |
| 7,027,411 B1 | 4/2006 | Pulsipher |
| 7,392,300 B2 | 6/2008 | Anantharangachar |
| 7,617,073 B2 | 11/2009 | Trinon |
| 7,877,783 B1 | 1/2011 | Cline |
| 7,945,860 B2 | 5/2011 | Vambenepe |
| 8,554,750 B2 | 10/2013 | Rangarajan |
| 10,505,828 B2 * | 12/2019 | Yadav ...................... H04L 1/242 |
| 2010/0179945 A1 * | 7/2010 | Rangarajan ......... G06F 16/2365 707/694 |
| 2016/0234073 A1 * | 8/2016 | Maes ...................... H04L 67/10 |
| 2016/0269249 A1 * | 9/2016 | Maes .................... G06F 16/215 |

* cited by examiner

*Primary Examiner* — Arvin Eskandarnia
(74) *Attorney, Agent, or Firm* — Fletcher Yoder PC

(57) ABSTRACT

A computational instance may includes a set of computing devices and a configuration management database (CMDB), wherein the CMDB contains a representation of a service deployed on a managed network, wherein the representation of the service includes metadata, service group membership, and an entry point, and wherein the computational instance is configured to: receive an instruction to export the representation of the service to a file; copy, to a metadata object in the file, the metadata; determine a hierarchical subset of the service groups that are related to the service; write, to one or more service group objects in the file, the hierarchical subset of the service groups; determine, from a list of entry points of the managed network, that the entry point is of the service; and write, to an entry point object in the file, the entry point.

20 Claims, 19 Drawing Sheets

```
{
    "UID":"24AF8F84DB31270014E97A6EAF961993",
    "NAME":"JENKINS",
    "SERVICE_ID":"24AF8F84DB31270014E97A6EAF961993",
    "SERVICE_NAME":"JENKINS",
    "TABLE_NAME":"CMDB_CI_SERVICE_DISCOVERED",
    "DATA":"{"SOURCE":"DISCOVERY","TYPE":"2","VIEW_MAP":"5C38C522533321001
C1379E5A11C088B","TRAFFIC_DISCOVERY":"1","PRIORITY":"1","BUSINESS_CRITICALIT
Y":"1 - MOST CRITICAL","LAST_DISCOVERED":"","SERVICE_CLASSIFICATION":
"BUSINESS SERVICE"}"
},

{
    "UID":"0E7A06157F10310016181CCEBEFA91CE",
    "NAME":"ALL",
    "SERVICE_ID":"",
    "TABLE_NAME":"CMDB_CI_SERVICE_GROUP",
    "DATA":"{"PARENT_GROUP":"","BUSINESS_CRITICALITY":""}"
},

{
    "UID":"69D0646BDB8833004BA0DF8B4B9619F0",
    "NAME":"ISRAEL",
    "SERVICE_ID":"24AF8F84DB31270014E97A6EAF961993",
    "SERVICE_NAME":"JENKINS",
    "TABLE_NAME":"CMDB_CI_SERVICE_GROUP",
    "DATA":"{"OPERATIONAL_STATUS":"1","PARENT_GROUP":"0E7A06157F1031001618
1CCEBEFA91CE","NAME":"ISRAEL","BUSINESS_CRITICALITY":"2 - SOMEWHAT
CRITICAL","SERVICE_CLASSIFICATION":"BUSINESS SERVICE"}"
},

{
    "UID":"A1545998DB0833004BA0DF8B4B961969",
    "NAME":"HTTPS://10.196.39.231:8080",
    "SERVICE_ID":"24AF8F84DB31270014E97A6EAF961993",
    "SERVICE_NAME":"JENKINS",
    "TABLE_NAME":"CMDB_CI_ENDPOINT_HTTP",
    "DATA":"{"OPERATIONAL_STATUS":"1","PROTOCOL":"HTTPS","DISCOVERY_SOURCE
":"SERVICEWATCH",\"FIRST_DISCOVERED":"2018-11-11 09:33:10",
"HOST":"10.196.39.231","INSTALL_STATUS":"1", "PORT":"8080","NAME":"HTTPS://
10.196.39.231:8080","LAST_DISCOVERED":"2018-12-19 14:22:06",
"IP_ADDRESS":"10.196.39.231","URL":"HTTPS://10.196.39.231:8080"}"
}
```

INTELLIGENT EXPORT AND IMPORT OF SERVICE REPRESENTATIONS

BACKGROUND

Enterprises that use a remote network management platform may interact with two or more computational instances thereof. Each of these computational instances may be dedicated to the enterprise and may provide discovery, service mapping, software management, helpdesk functions, and workflows (just to name a few capabilities) to the enterprise by way of web-based or other interfaces of the computational instances. Each computational instance may thus include one or more computing devices operating server functions and one or more database devices operating data storage and arrangement functions.

The enterprise may use more than one computational instance in order to develop and test new features and services before they are formally rolled out to the enterprise. Thus, the enterprise may use a production instance for actual live operations, and a testing instance (or a development instance) for trying out and adjusting the behavior of new features and services. Once the features and services on the testing instance are considered to be mature and reasonably defect-free, they may be deployed to the production instance.

But, at least in the case of service mapping, doing so by naively copying a service map from the testing instance to the production instance is compute-intensive and will often introduce errors. Thus, simple exporting of a service map representation from one instance to a file (or other representation) and then importing this file into another instance is not a viable solution in general.

SUMMARY

Service mapping may involve a computational instance of a remote network management platform obtaining information related to sets of interconnected computing devices and applications operating on a managed network (e.g., of an enterprise). These devices and applications may be configured to provide a specific service. For instance, a web-based service may involve a load balancer directing traffic to various web servers, which in turn obtain data from various databases. While each of these devices and applications can be individually discovered, the web service that they provide in combination may not be apparent by examining any one thereof.

Thus, service mapping is an automated, semi-automated or manual way of specifying the devices and applications that contribute to a higher-level service. Service mapping builds viewable maps of these devices and applications with any dependencies therebetween indicated as such. Advantageously, service maps can help an enterprise understand the services impacted, for example, by a failed database or by a server device that is to be taken out of service for an upgrade. Service maps can also help the enterprise determine the root cause of a problem that impacts the performance or availability of a service.

Often, service maps can be automatically discovered, at least in part. Afterward, a user may manually edit the service map so that it accurately represents the full extent and nuances of the service it represents. For example, program logic may be added to the service map so that the service map accurately reflects certain dependencies. As noted above, this discovery and editing may initially take place by way of a testing instance. When the service map is considered to be properly configured, it is desirable to be able to migrate it to a production instance.

But, users who do the development and testing of a service map on the testing instance may not have the same permissions and authorizations as the users who deploy the service map to the production instance and thereafter manage it. Thus, the service maps for the same service as represented in the testing and production instances map be different. In order to accommodate this consideration, a service representation may be exported and imported based on its metadata (e.g., names, definitions, and general information about the represented service), service groups (e.g., a logical collection of related services to which the service belongs), and entry point (e.g., a network address at which the service can be invoked or discovered). Notably, any extraneous information that may be different between the testing and production instances (including representations of at least some the actual nodes and connections therebetween) may be omitted from the file.

In particular, a representation the service, including its metadata, service groups, and entry point, may be saved to a file. This file may be JavaScript Object Notation (JSON), extensible markup language (XML), or some other structured or unstructured file format. Notably, the "map" itself may be omitted from the file, as it can be recreated by the production instance.

Then, the file may be imported into the production instance. Doing so may populate the metadata, service group, and entry point definitions into the appropriate database tables and/or files. Also, after the file is imported, top-down discovery of the service may be initiated automatically using the entry point. In this way, a new service map is generated that accurately represents the characteristics of the service as managed by the production instance.

Advantageously, the process outlined above maintains the integrity of services and service maps between testing and production instances without requiring storage of entire service map representations and without requiring manual recreation of each aspect of the representation.

Accordingly, a first example embodiment may involve receiving, by a source computational instance of a remote network management platform, an instruction to export a representation of a service to a file, wherein the source computational instance includes a first set of computing devices and a source configuration management database (CMDB), wherein the source CMDB contains the representation of the service as deployed on a managed network, and wherein the representation of the service includes metadata, service group membership, and an entry point. The first example embodiment may further involve copying, from the source CMDB and to a metadata object in the file, the metadata. The first example embodiment may further involve determining, from a mapping between service groups associated with the managed network, a hierarchical subset of the service groups that are related to the service. The first example embodiment may further involve writing, to one or more service group objects in the file, the hierarchical subset of the service groups that are related to the service. The first example embodiment may further involve determining, from a list of entry points of the managed network, that the entry point is of the service. The first example embodiment may further involve determining, from the source CMDB, a class of the entry point. The first example embodiment may further involve writing, to an entry point object in the file, the entry point and the class of the entry point.

A second example embodiment may involve receiving, by a target computational instance of a remote network management platform, an indication to load a file, wherein the file contains a metadata object specifying metadata of a service deployed on a managed network, one or more service group objects specifying a hierarchical subset of service groups related to the service, and an entry point object specifying an entry point of the service, wherein the target computational instance includes a set of computing devices and a target CMDB, and wherein the file was exported from a source computational instance of the remote network management platform. The second example embodiment may further involve copying, to temporary storage in the target CMDB, the metadata from the metadata object, the hierarchical subset of the service groups from the one or more service group objects, and the entry point from the entry point object. The second example embodiment may further involve copying, from the temporary storage to a metadata table in the target CMDB, a representation of the metadata. The second example embodiment may further involve copying, from the temporary storage to a service group table in the target CMDB, representations of the service groups. The second example embodiment may further involve copying, from the temporary storage to an entry point table in the target CMDB, a representation of the entry point. The second example embodiment may further involve initiating, by the target computational instance and by way of the entry point, discovery of the service on the managed network.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 9 depicts a file, in accordance with example embodiments.

DETAILED DESCRIPTION

Figure 1:
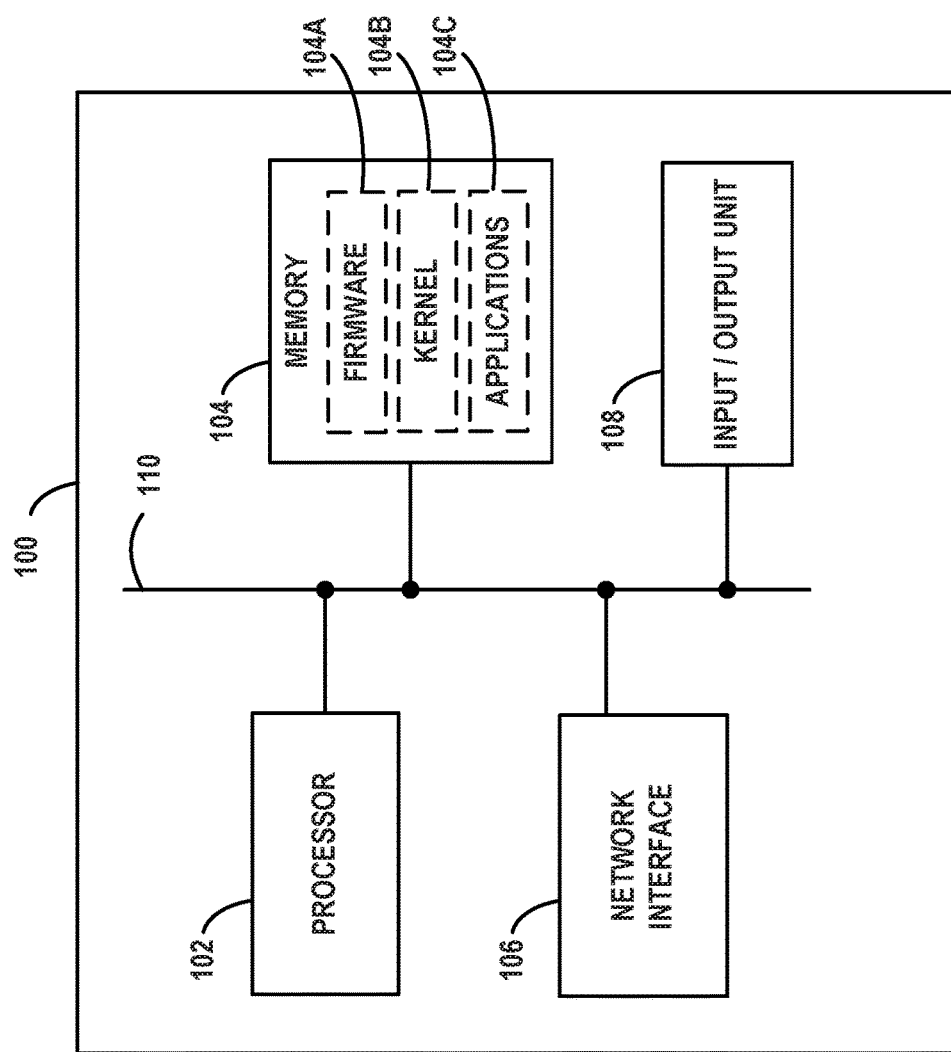
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
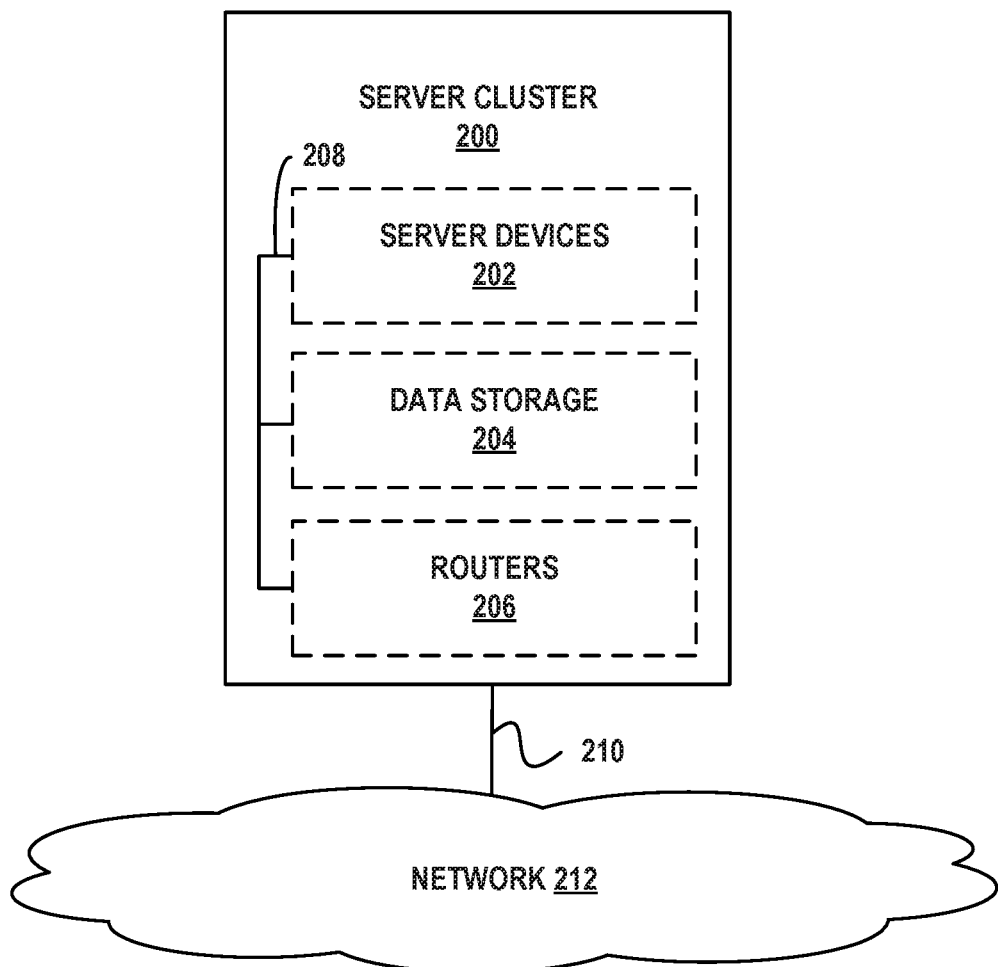
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
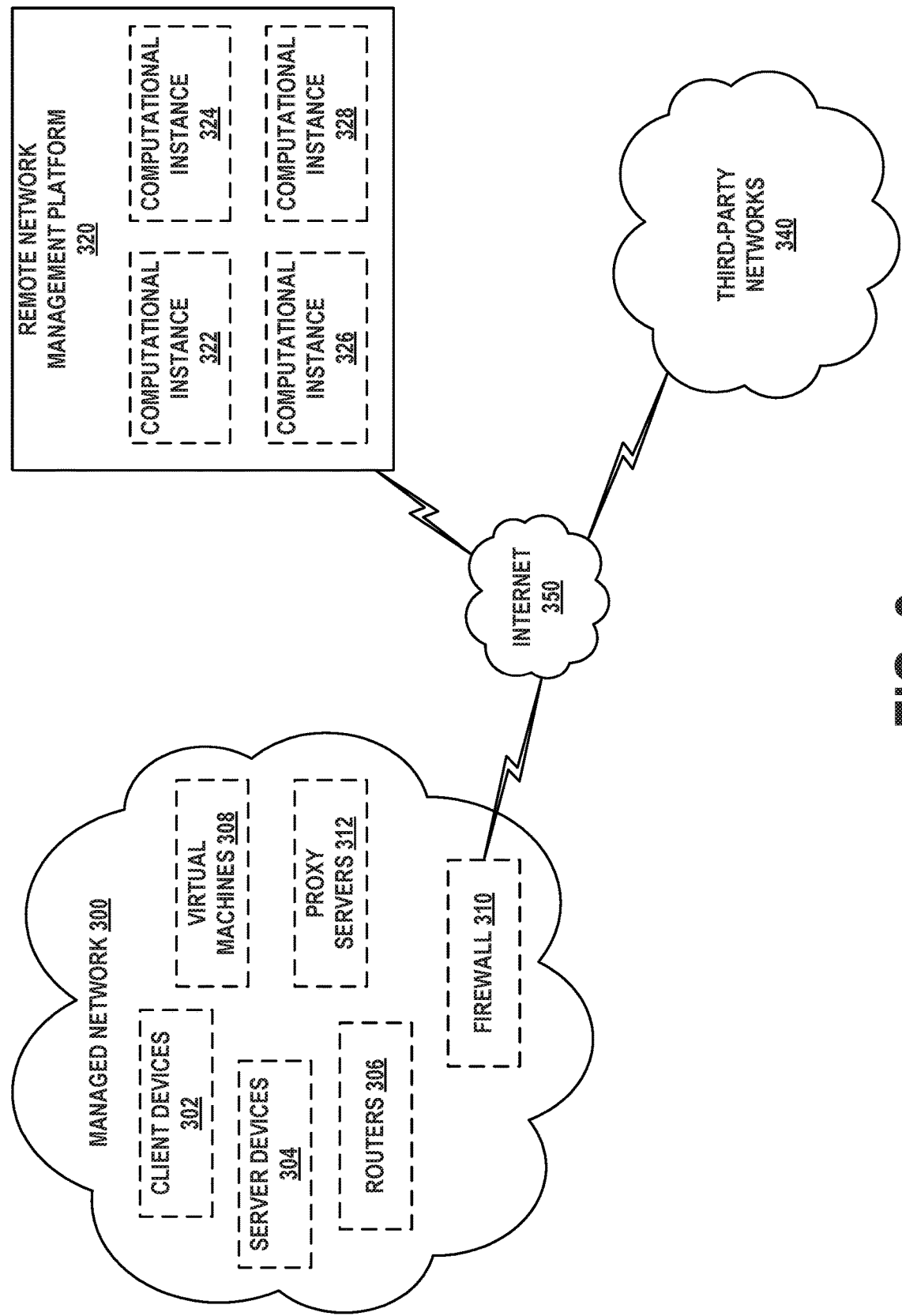
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are commingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents commingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
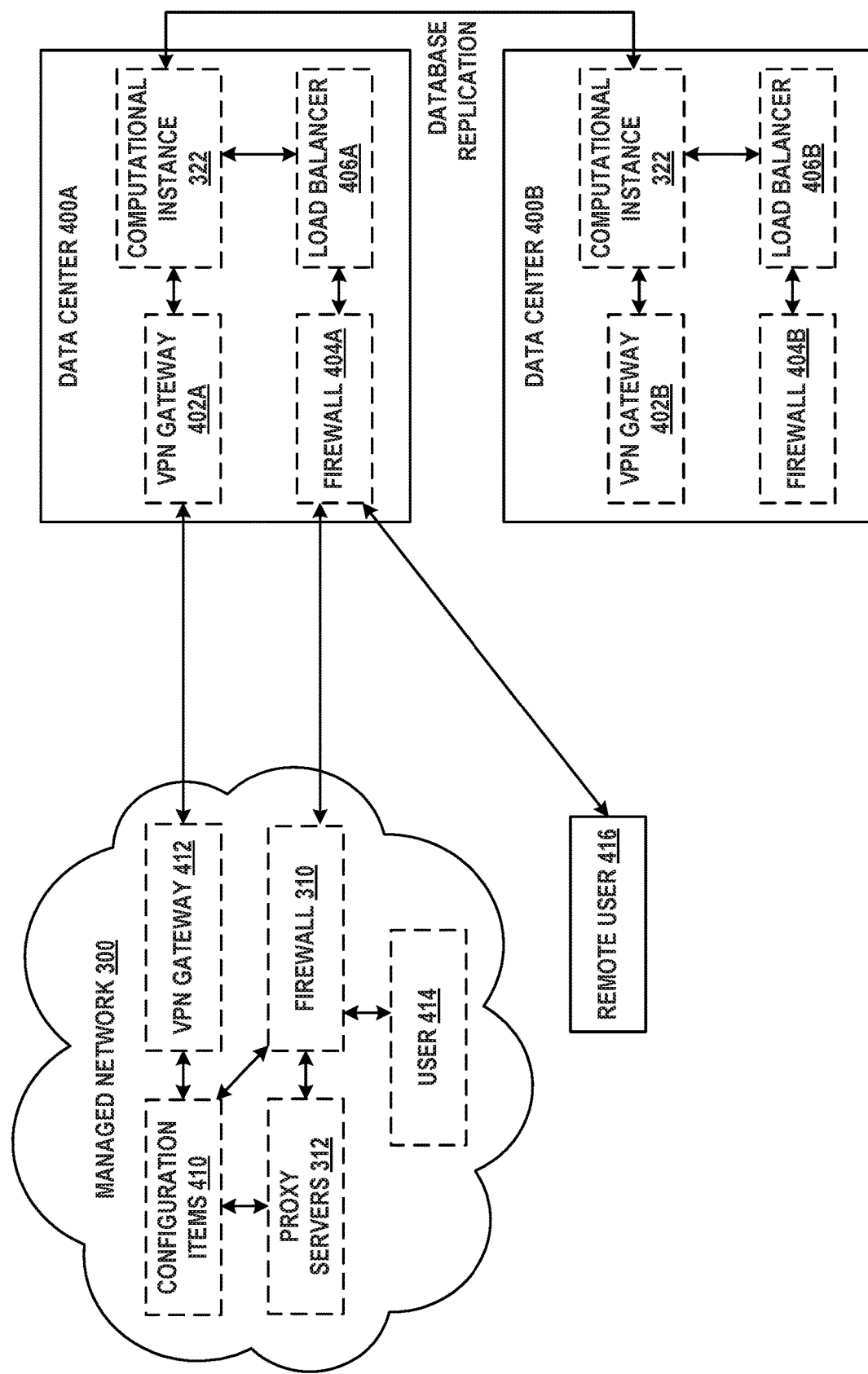
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
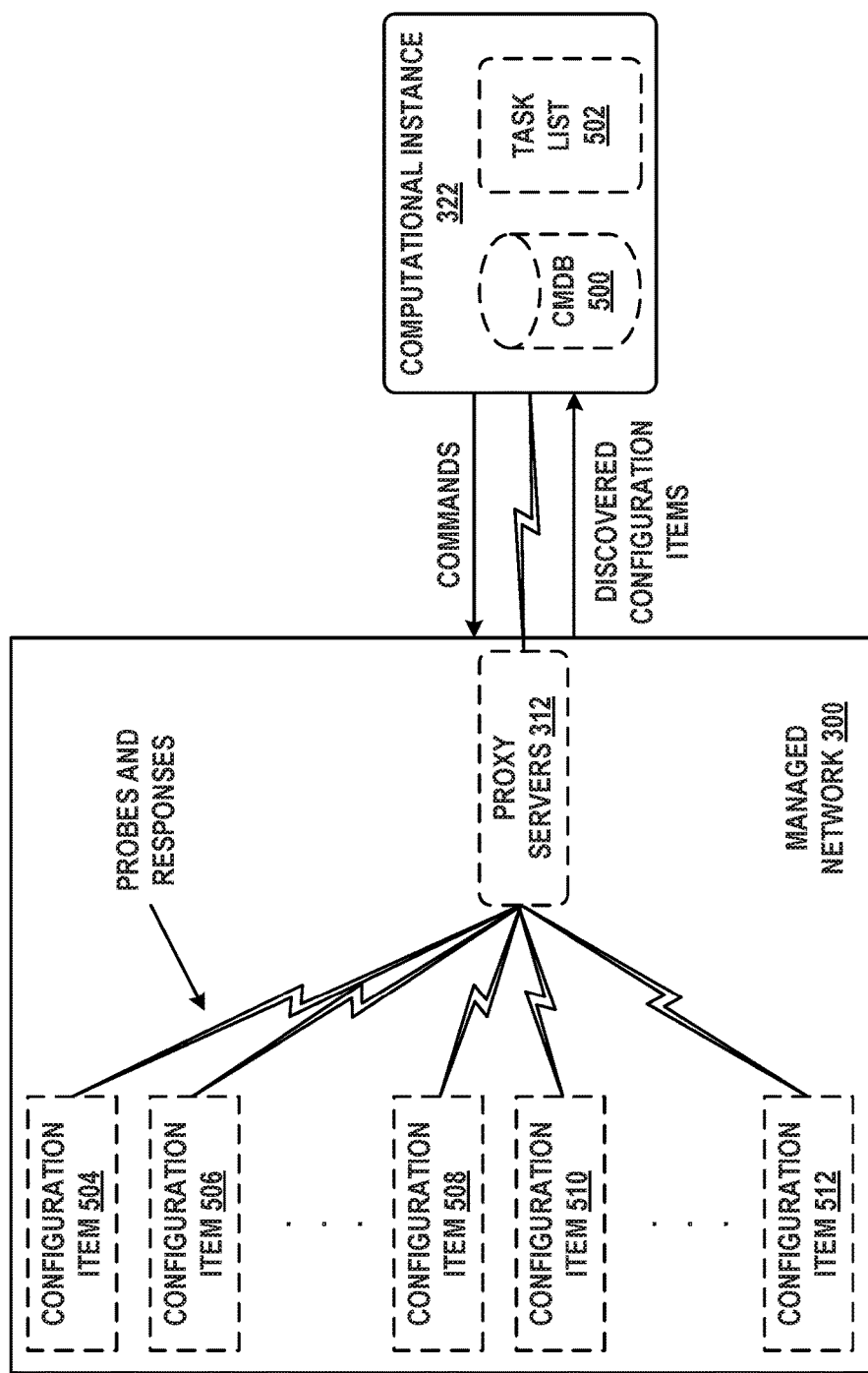
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
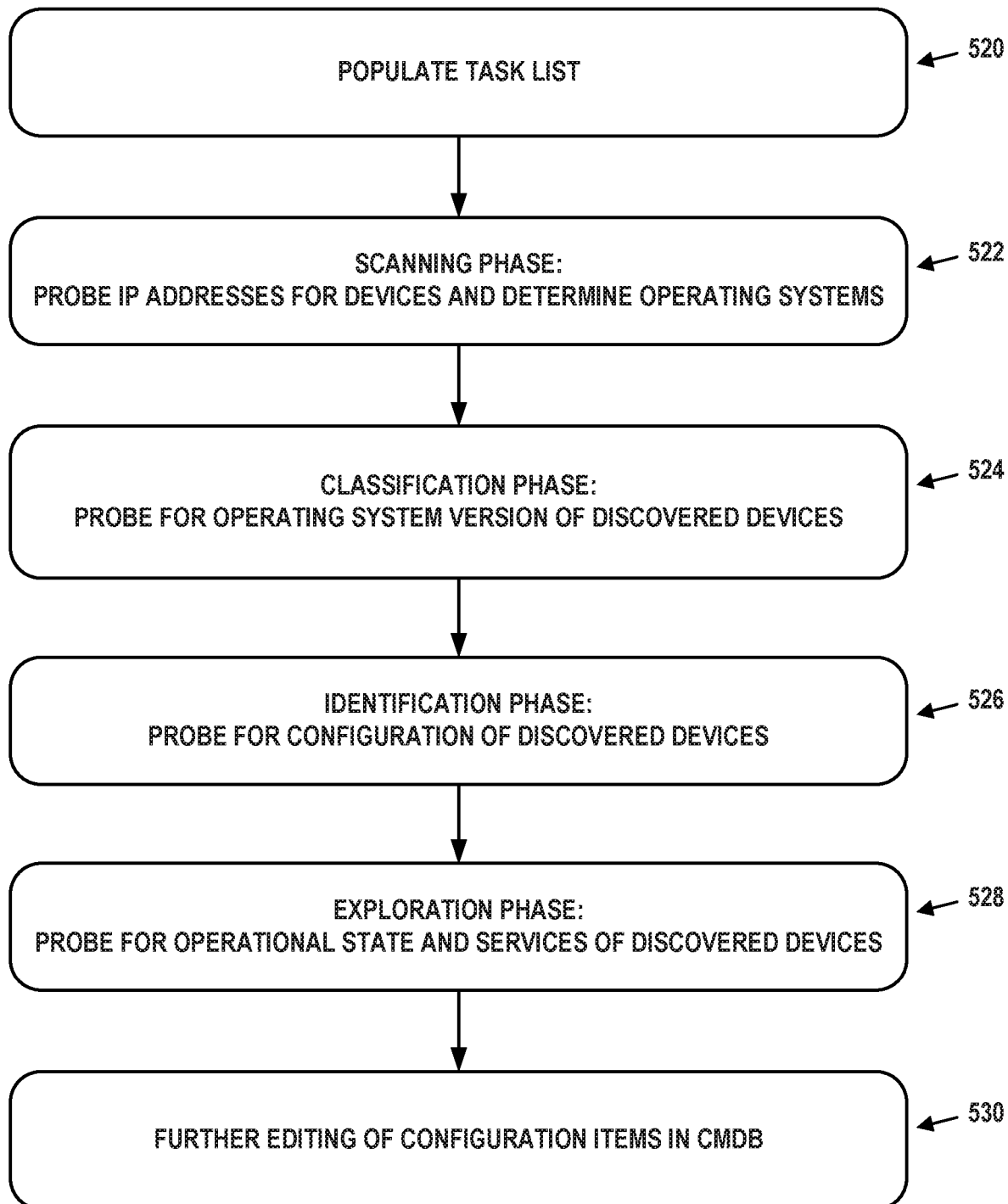
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Example Service Mapping

Service mapping may involve a computational instance obtaining information related to sets of interconnected computing devices and applications, operating on a managed network, that are configured to provide a service. This service may either be provided internally to the managed network (e.g., an organizational email service) or externally to customers of the managed network (e.g., an external web site). Service mapping builds viewable maps of the configuration items (e.g., the computing devices, applications, and any related configuration information or profiles) used to provide the service. Dependencies between these configuration items may be based on relationships between the computing devices and applications.

Thus, a service map may be a visual representation on a web-based GUI, for instance, that depicts particular applications operating on particular computing devices in the managed network as nodes in a graph. The edges of the graph may represent physical and/or logical network connectivity between these nodes. This visual representation allows users to rapidly determine the impact of a problematic configuration item on the rest of the service. For instance, rather than viewing, in isolation, the properties of a database application, this application can be represented as having connections to other applications and the computing devices that rely upon or support the application. Thus, if the database is exhibiting a problem (e.g., running out of storage capacity), the impacted service(s) can be efficiently determined.

Discovery procedures may be used, at least in part, to determine the relationships between computing devices and applications that define services. Alternatively or additionally, services and/or components thereof may be manually defined after discovery has at least partially completed. From this information, a service map can be derived.

Figure 6:
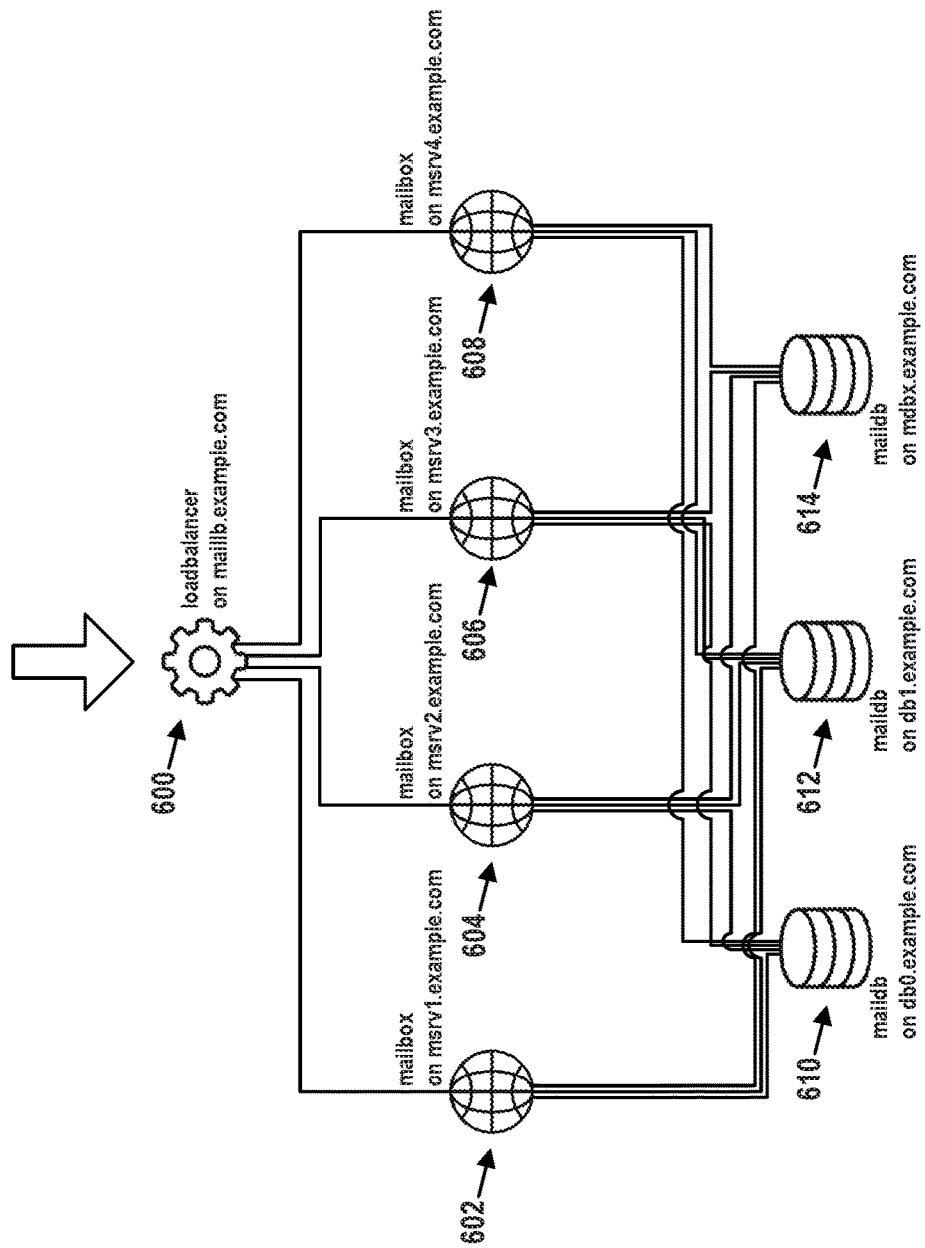
FIG. 6 depicts a service map, in accordance with example embodiments.

FIG. 6 provides an example service map including applications and computing devices that make up an email service that supports redundancy and high-availability. This service map may be generated for display on the screen of a computing device. As noted above, the nodes in the service map represent applications operating on computing devices. These nodes may take the form of icons related to the respective functions of the applications or computing devices.

The entry point to the email service, as designated by the large downward-pointing arrow, may be load balancer 600. Load balancer 600 may be represented with a gear icon, and may operate on a device with host name maillb.example.com. This host name, as well as other host names herein, may be a partially-qualified or fully-qualified domain name in accordance with DNS domain syntax.

Load balancer 600 may distribute incoming requests across mailbox applications 602, 604, 606, and 608 operating on mail server devices msrv1.example.com, msrv2.example.com, msrv3.example.com, and msrv4.example.com, respectively. These mail server devices may be represented by globe icons on the service map. Connectivity between load balancer 600 and each of mailbox applications 602, 604, 606, and 608 is represented by respective edges.

Mailbox applications 602, 604, 606, and 608 may, for instance, respond to incoming requests for the contents of a user's mail folder, for the content of an individual email message, to move an email message from one folder to another, or to delete an email message. Mailbox applications 602, 604, 606, and 608 may also receive and process incoming emails for storage by the email service. Other email operations may be supported by mailbox applications 602, 604, 606, and 608. For sake of example, it may be assumed that mailbox applications 602, 604, 606, and 608 perform essentially identical operations, and any one of these applications may be used to respond to any particular request.

The actual contents of users' email accounts, including email messages, folder arrangements, and other settings, may be stored in one or more of mail database applications 610, 612, and 614. These applications may operate on database server devices db0.example.com, db1.example.com, and mdbx.example.com, which are represented by database icons on the network map. Connectivity between mailbox applications 602, 604, 606, and 608 and each of mail database applications 610, 612, and 614 also is represented by respective edges.

Mailbox applications 602, 604, 606, and 608 may retrieve requested data from mail database applications 610, 612, and 614, and may also write data to mail database applications 610, 612, and 614. The data stored by mail database applications 610, 612, and 614 may be replicated across all of the database server devices.

As an example of the operation of the email service depicted by the map of FIG. 6, an incoming email message may arrive at load balancer 600. This email message may be addressed to an email account (e.g., user@example.com) supported by the email service. Load balancer 600 may select one of mailbox applications 602, 604, 606, and 608 to store the email message. For instance, load balancer 600 may make this selection based on a round-robin procedure, the loads (e.g., CPU, memory, and/or network utilization) reported by mailbox applications 602, 604, 606, and 608, randomly, or some combination thereof.

Assuming that load balancer 600 selects mailbox application 604, load balancer 600 then transmits the email message to mailbox application 604. Mailbox application 604 may perform any necessary mail server functions to process the email message, such as verifying that the addressee is supported by the email server, validating the source of the email message, running the email message through a spam filter, and so on. After these procedures, mailbox application 604 may select one of mail database applications 610, 612, and 614 for storage of the email message. Similar to load balancer 600, mailbox application 604 may make this selection based on various criteria, including load on mail database applications 610, 612, and 614.

Assuming that mailbox application 604 selects mail database application 610, mailbox application 604 then transmits the email message to mail database application 610. Mail database application 610 may perform any necessary mail database functions to process and store the email message. For instance, mail database application 610 may store the message as a compressed file in a file system, and update one or more database tables to represent characteristics of the email message (e.g., the sender, the size of the message, its importance, where the file is stored, and so on).

When a mail client application (not shown) requests a copy of the email message, this request may also be received by load balancer 600. Load balancer 600 may select one of mailbox applications 602, 604, 606, and 608 to retrieve the email message. This selection may be made according to various criteria, such as any of those discussed above. Assuming that load balancer 600 selects mailbox application 608, mailbox application 608 then selects one of mail database applications 610, 612, and 614. Assuming that mailbox application 608 selects mail database application 612, mailbox application 608 requests the email message from mail database application 612.

Since data is replicated across mail database applications 610, 612, and 614, mail database application 612 is able to identify and retrieve the requested email message. For instance, mail database application 612 may look up the email message in a database table, from the table determine where the email message is stored in its file system, find the email message in the file system, and provide the email message to mailbox application 608. Mailbox application 608 may then transmit the email message to the mail client application.

The arrangement of FIG. 6 may vary. For example, more or fewer load balancers, mailbox applications, mail database applications, as well as their associated devices, may be present. Furthermore, additional devices may be included, such as storage devices, routers, switches, and so on. Additionally, while FIG. 6 is focused on an example email service, similar service maps may be generated and displayed for other types of services, such as web services, remote access services, automatic backup services, content delivery services, and so on.

Nodes representing devices of the same type or operating the same application or type of application may be placed at the same horizontal level, as in FIG. 6. Nodes representing the entry point of the represented service may be placed at the top of the map, and the vertical arrangement of nodes may roughly correspond to the order in which the nodes become involved in carrying out operations of the service. Nonetheless, as the number of nodes and connections grows, such arrangements may vary for purposes of making presentation of the service map readable.

In some embodiments, a service map may be defined as a graph by the nodes therein and connections between these nodes. In addition, a service map definition may include metadata, an entry point, and an indication of service group membership. The metadata may include a name, an owner, a criticality, and/or a discovery type associated with the service map.

As noted above, the entry point may define a URL or other network address through which the devices and applications that are included in the service map can be directly or indirectly reached. For example, the entry point may be a URL of the service that end users can enter to access the service by way of a protocol such as the hypertext transfer protocol (HTTP) or TCP. In the embodiment of FIG. 6, the domain name maillb.example.com may be considered the entry point of the represented email service. Notably, various types of services (e.g., email, web, database, CRM, cloud-based resources, etc.) may define entry points in various ways.

The service group membership may indicate a logical group to which the service map belongs. Such a service group may be part of a group hierarchy that associates services that are related in some fashion (e.g., based on the type of the service, geographic location of the service, and/or the owner of the service).

Figure 7:
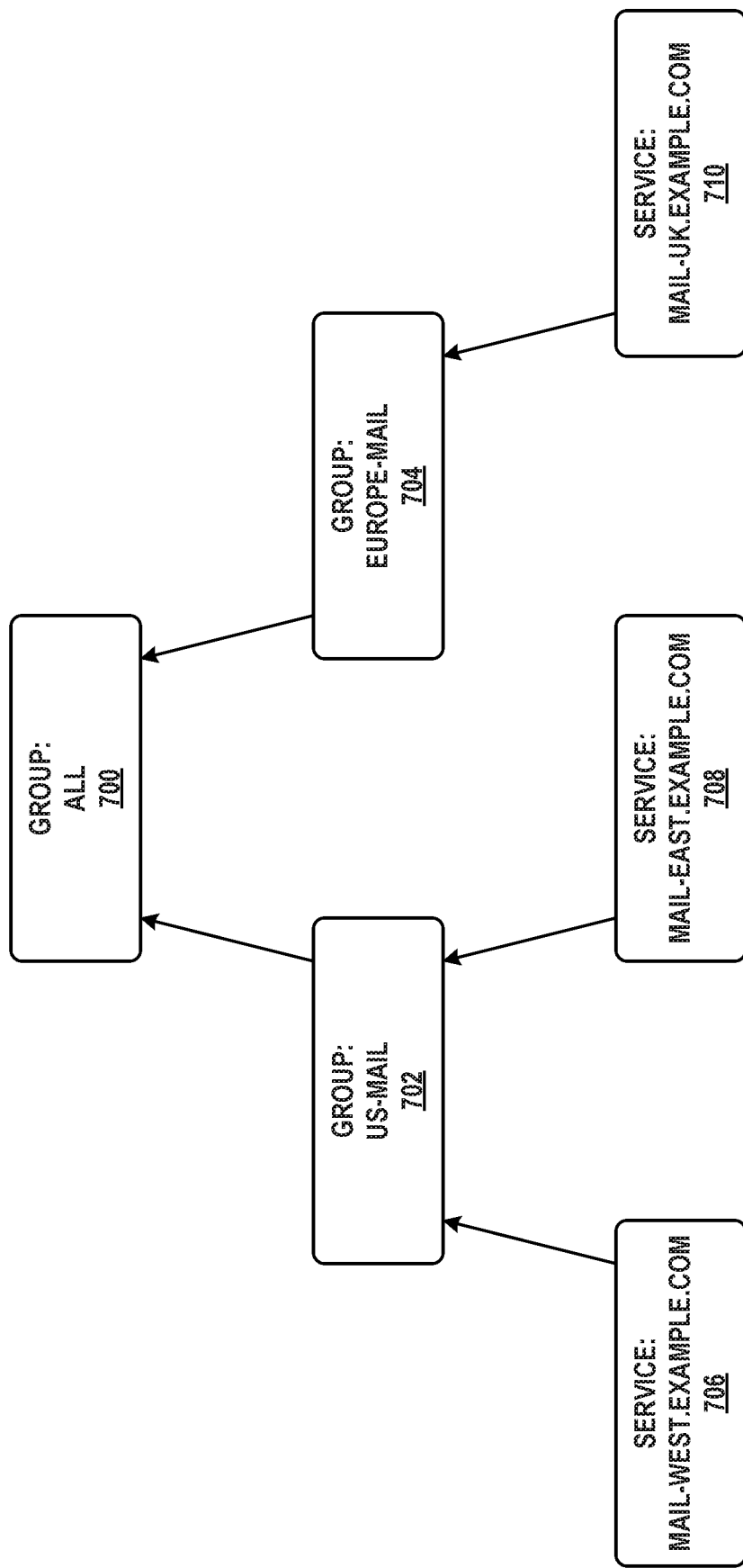
FIG. 7 depicts a service mapping group hierarchy, in accordance with example embodiments.

FIG. 7 illustrates an example geographic hierarchy of service groups. It is assumed that an enterprise uses three distinct email services, one for its employees on the west coast of the U.S. (mail-west.example.com 706), one for its employees on the east coast of the U.S. (mail-east.example.com 708), and another for its U.K. employees (mail-uk.example.com 710). For administrative purposes, the enterprise assigns mail-west.example.com 706 and mail-east.example.com 708 to be members of the service group us-mail 702, and also assigns mail-uk.example.com 710 to be a member of the service group europe-mail 704. Both the us-mail 702 and europe-mail 704 service groups are members (children) of the service group ALL 700. In this way, the services and their associated service maps can be logically organized in any fashion that is convenient to the enterprise.

VII. Intelligent Export and Import of Service Representations

FIGS. 8A, 8B, 8C, and 8D are flow charts depicting an example service export procedure. This procedure may be performed by a testing instance of a remote network management platform, for example. Despite these figures containing particular steps arranged in a particular order, more or fewer steps may be performed in a different order without departing from the embodiments herein.

Figure 8A:
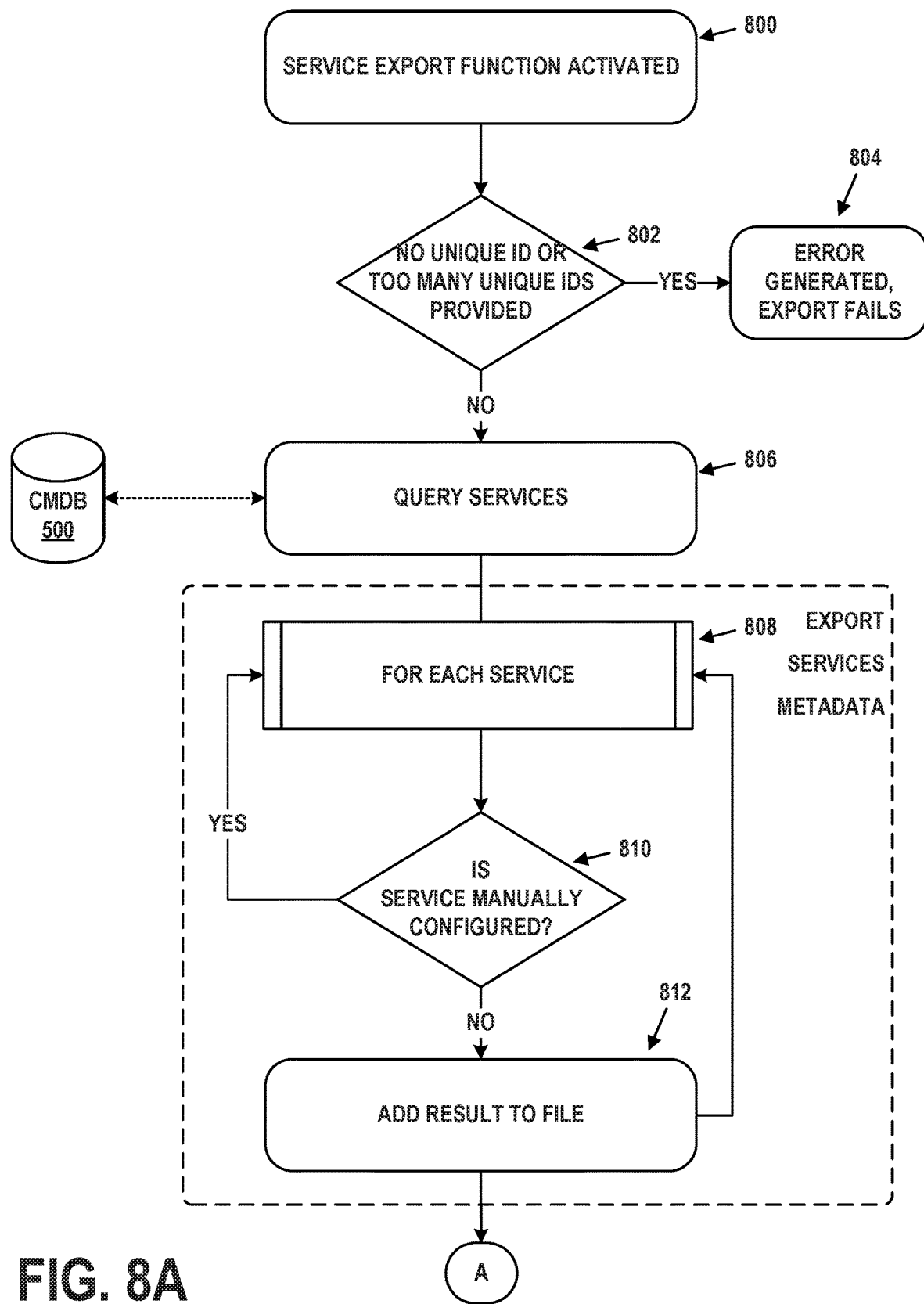
FIGS. 8A, 8B, 8C, and 8D depict a service export procedure, in accordance with example embodiments.

At step 800 of FIG. 8A, the service export function is activated. This may involve a user selecting references to one or more services displayed on a GUI of the testing instance. These references may be names or other indicators of the services. Selecting services at step 800 may cause the testing instance to identify a number of unique identifiers for services associated with the selected services.

At step, 802, the testing instance determines whether this selection involves no unique identifiers or more than a threshold number of unique identifiers. The threshold number of unique identifiers may be configured with default values of 5, 10, or 20 for example.

If no unique identifiers or more than the threshold number of unique identifiers are selected, then at step 804 the testing instance may generate an error message and terminate the export process. The user may then have an opportunity to select a different number of service references in another attempt to export services.

At step 806, the testing instance may query CMDB 500 for more information about each service associated with a selected service. For example, the testing instance may query CMDB 500 for metadata regarding these services. The metadata may include names of the services, identifiers of the services, references to database (e.g., CMDB) tables related to the services, whether the services were discovered automatically or manually provisioned, priorities of the services, criticalities of the services, and/or classifications of the services as well as various other additional information.

Steps 808, 810, and 812 involve exporting the retrieved metadata to a file. At step 808, the testing instance iterates over each selected service. At step 810, the testing instance determines whether the service under consideration was manually provisioned. If this is the case, the service is skipped and its metadata is not written to the file. The reason for doing so is that manually-configured services may not be able to be automatically discovered when imported into the production instance due to configuration differences between these computational instances. Also manually-configured services are defined by their configuration items within the service maps, but these configuration items are not exported by design and for reasons of efficiency. Regardless, at step 812 the metadata for the service under consideration (which was not manually configured) is written to the file.

Figure 8B:
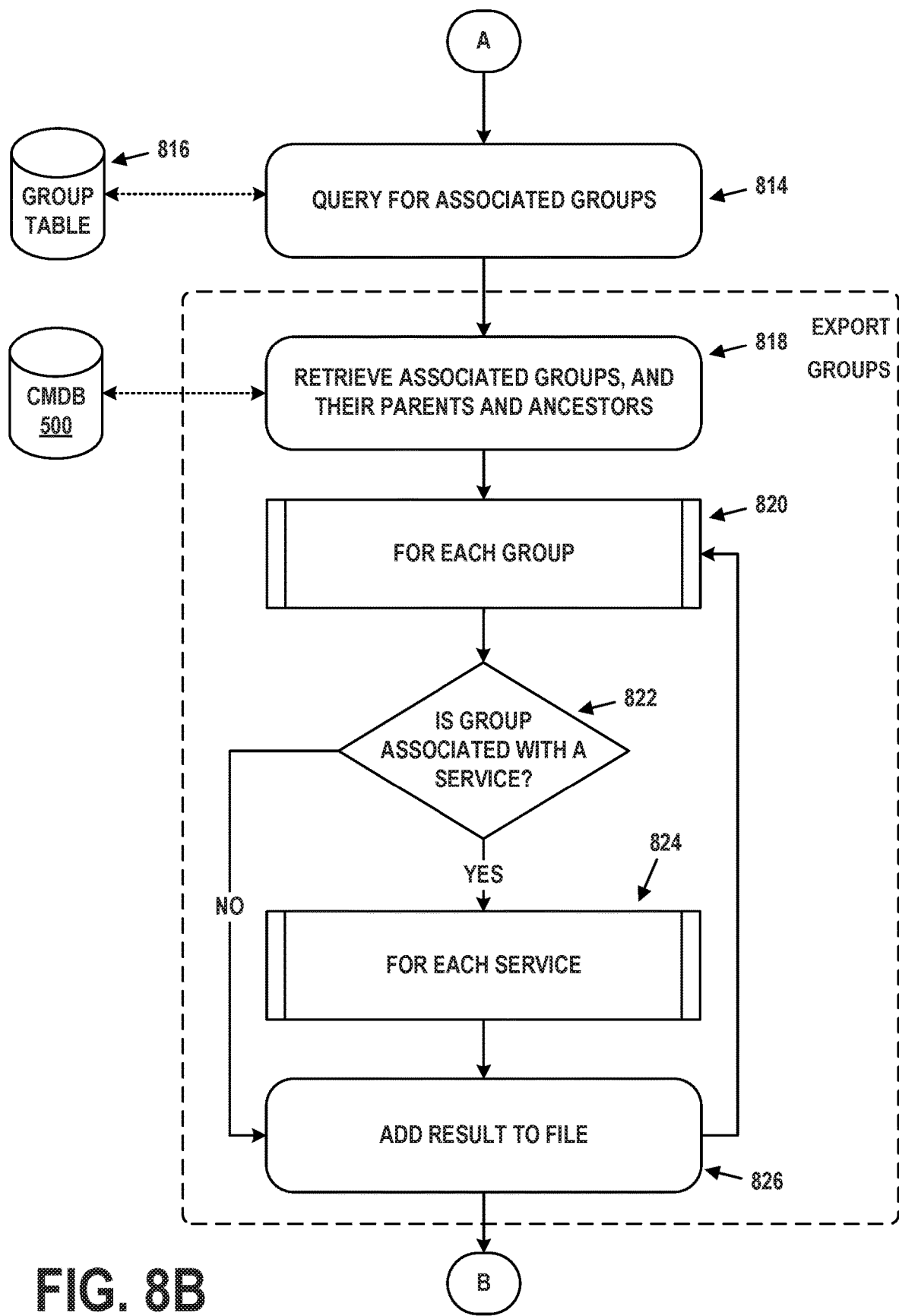

Continuing to FIG. 8B, at step 814 the testing instance queries group table 816 for service groups associated with the services. For example, the testing instance may use the unique identifiers of the services to look up the unique identifiers of associated service groups.

Steps 818, 820, 822, 824, and 826 involve exporting these service groups to the file. At step 818, the testing instance retrieves definitions of the service groups and their parent and ancestor groups from CMDB 500. These definitions may include the service groups' names, unique identifiers, parent groups, and possibly other information as well.

Step 820 indicates that steps 822, 824, and 826 are carried out for each group. Notably, step 822 determines whether the group is associated with a service. If it is not, then the testing instance writes a representation of the service group to the file at step 826. If the service group is associated with a service, then step 824 iterates though each service and step 826 writes a representation of the service group and its relationship to the service to the file. This results in there being one representation of the group in the file if the group is a just a parent to other groups, but there being n representations of the group in the file if the group is associated with n services. As a consequence, a representation of the hierarchy of the service group is added to the file.

Figure 8C:
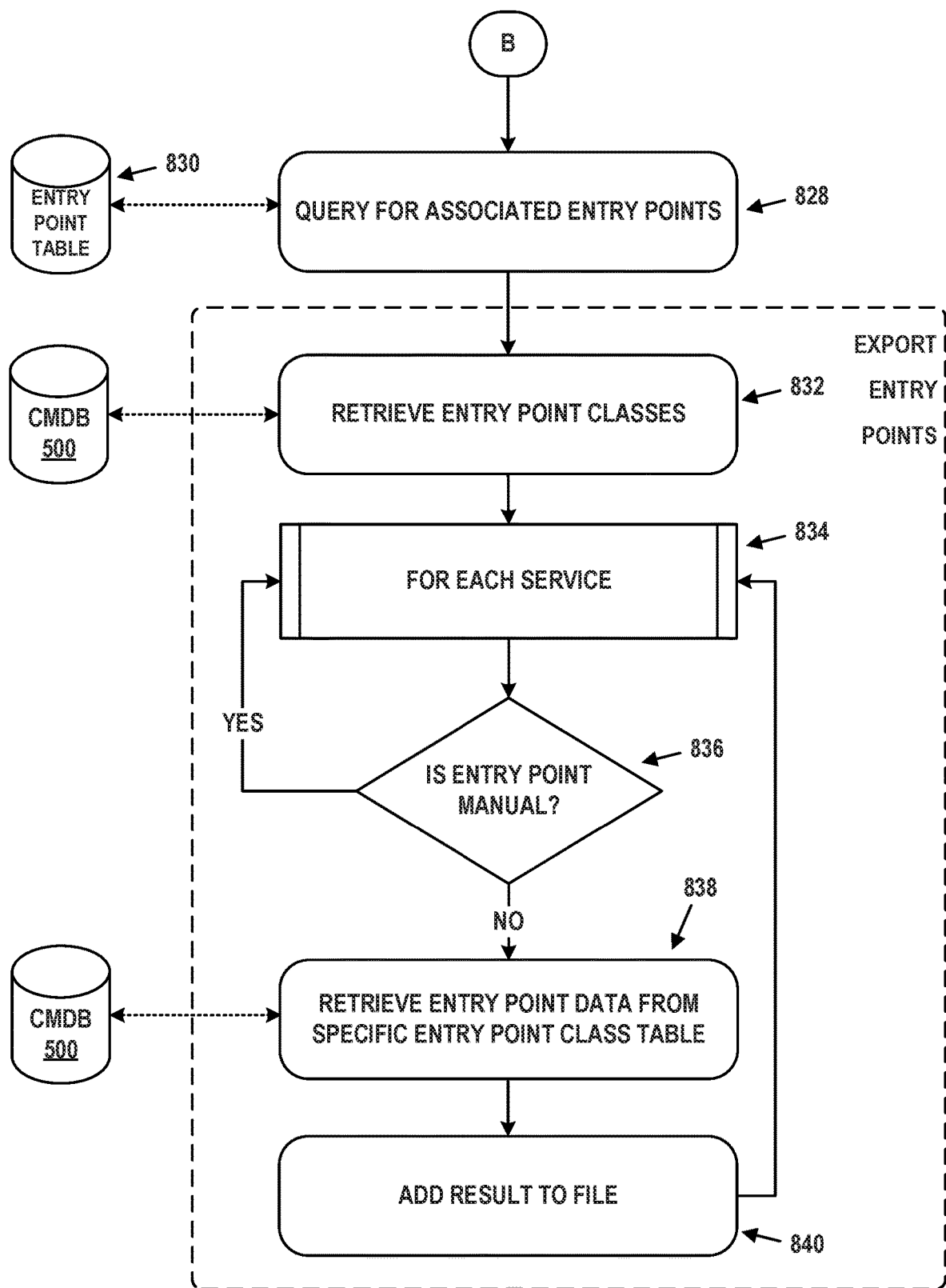

Continuing to FIG. 8C, at step 828, the testing instance may query entry point table 830 for each of the services. For example, the testing instance may use the unique identifiers of the services to look up the unique identifiers of associated entry points.

At step 832, the testing instance may query CMDB 500 to determine the classes of each entry point. Example entry point classes include HTTP (for services accessible via HTTP), TCP (for services accessible via TCP), etc.

Step 834 indicates that steps 836, 838, and 840 are carried out for each entry point. At step 836, the testing instance determines whether the entry point under consideration was manually configured. This determination may be made, for example, from the entry point's class. If the entry point was manually configured, the testing instance moves on to the next service and does not write a representation of this entry point to the file. Otherwise, at step 838, testing instance retrieves specific configuration data regarding the entry point from CMDB 500. This configuration data may be found in a table in CMDB 500 that is specific to the entry point's class (e.g., entry points of the HTTP and TCP classes may appear in different tables). At step 840, at least some of this data may be written to a representation of the entry point in the file.

Figure 8D:
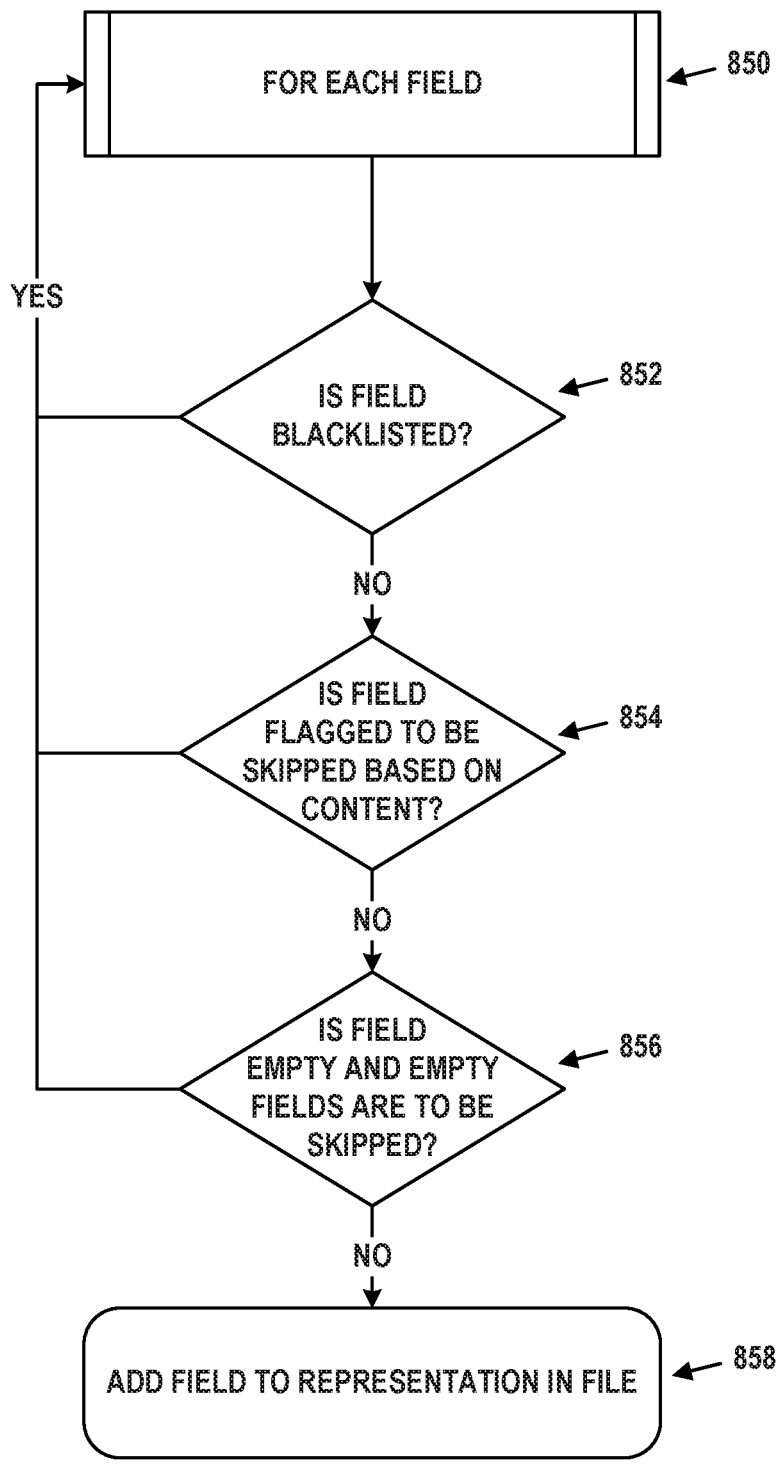

In steps 812, 826, and 840 of FIGS. 8A, 8B, and 8C, respectively, representations of information related to services are written to a file. For each of these representations (e.g., metadata, service groups, and entry points), additional fields may be written to the file as well. FIG. 8D depicts a flow chart that illustrates how the testing instance may determine whether to include certain fields in one or more of these representations.

Step 850 indicates that steps 852, 854, 856, and 858 are carried out for each field of the representation (e.g., metadata, a service group, or an entry point) under consideration. At step 852, the testing instance checks whether the field is blacklisted. In some embodiments, the testing instance may be configured with a blacklist of fields that are not to be written to the file. If the field is in the blacklist, the testing instance moves on to the next field.

Otherwise, at step 854, the testing instance determines whether the field is flagged to be skipped based on its content. For example, a system-level field that specifies a date and time that the metadata, group, or endpoint was created or updated may be skipped because these values would be overwritten by the production instance when the file is imported. Similarly, reference fields that specify other tables and/or fields may be skipped because those tables or fields may or may not be present in the production instance. If the field is flagged to be skipped based on its content, the testing instance moves on to the next field.

Otherwise, at step 856, the testing instance determines whether the field is empty and empty fields are configured to be skipped. Doing so reduces the size of the file, thereby conserving memory. If the field is empty and empty fields are configured to be skipped, the testing instance moves on to the next field. Otherwise, at step 858, the field is added to the representation in the file.

Notably, the export procedure is flexible and user-configurable. Thus, any of the services, metadata, service groups, entry points, or fields thereof that might otherwise be skipped may be written to the file if desired.

As noted above, a file can be formatted in accordance with JSON, XML, or some other structured or unstructured file format. FIG. 9 depicts an example JSON file. This file contains four parts: metadata object 900, parent group object 902, service group object 904, and entry point object 906. The file represents a single service named "JENKINS" that is a member of the service group "ISRAEL". This service group, in turn, has a parent group "ALL". This file may have been created by way of the embodiments depicted in FIGS. 8A, 8B, 8C, and 8D.

Metadata object 900 specifies the unique identifier (UID) of the service, the name of the service ("JENKINS"), the service identifier of the service (in this case, the same as the unique identifier), the service name of the service (in this case, the same as the name of the service), and the name of the CMDB table in which the service is specified ("CMDB_CI_service_discovered"). Metadata object 900 may also specify a "data" object that includes a number of fields. These fields may provide additional information about the metadata, such as its priority, criticality, and class.

Parent group object 902 specifies the UID of the parent group "ALL" as well as its name, a service identifier (which is blank because no service is a direct child of the parent group), and the name of the CMDB table in which the parent group is specified ("CMDB_CI_service_group"). Parent group object 902 may also specify a "data" object that includes a number of fields. These fields may provide additional information about the parent group, such as its parent group (which is empty because it has no further parent group) and well as its criticality.

Group data object 904 specifies the UID of the service group "ISRAEL" as well as its name, service identifier (which is a reference to the UID of the service specified in metadata object 900), service name (also a reference to the UID of the service specified in metadata object 900), and the name of the CMDB table in which the service group is specified ("CMDB_CI_service_group"). Group data object 904 may also specify a "data" object that includes a number of fields. These fields may provide additional information about the service group, such as its operational status, parent group (which is a reference to the UID of parent group object 902) its criticality, and its class.

Entry point object 906 specifies the UID of the entry point "https://10.196.39.231:8080", as well as its name, service identifier (which is a reference to the UID of the service specified in metadata object 900), service name (also a reference to the UID of the service specified in metadata object 900), and the name of the CMDB table in which the entry point is specified ("CMDB_CI_endpoint http"). Entry point object 904 may also specify a "data" object that includes a number of fields. These fields may provide additional information about the entry point, such as its operational status, its protocol, its host address, its port number, and so on.

Once a file, such as the one shown in FIG. 9, is created, it can then be imported into a production instance. Doing so effectively transfers definitions of the services in the file to a production instance. FIGS. 10A, 10B, 10C, and 10D depict such import procedures.

At step 1000, the user selects a file to import into the production instance. The file is uploaded to the production instance and temporarily stored for further processing.

At step 1002, the production instance determines whether the user has selected preview mode. For example, the production instance may display, by way of a GUI, a selectable option such as a checkbox that controls whether the preview mode has been selected. The preview mode may allow a limited number of services to be temporarily loaded to CMDB 500 for testing purposes. Representations of these services may be presented to the user on a web page, for example, so that the user can confirm that the proper file has been imported.

Thus, if preview mode is selected, steps 1004 and 1006 may be performed. At step 1004, the production instance test loads the first 20 (or some other number, e.g., 5, 10, 50) representations of services into CMDB 500. Each of these representations may be loaded with a state set to "test" so that it is clear that they are for testing purposes. At step 1006, a GUI dialog, pane, or window may be displayed containing a list of these services. From this list the user may be able to determine whether the uploaded file contains the intended services.

If preview mode is not selected, then at step 1008 the production instance loads all services (including metadata, service groups, and entry points) from the file into CMDB 500. At step 1010, the production instance performs the transformation flows of FIGS. 10B, 10C, and 10D. As will be discussed below, these flows involve loading definitions of the relevant metadata, service groups, and entry points into the appropriate locations of CMDB 500. At step 1012, after these flows complete, the production instance redirects the user to an import status page that reports on the progress and/or completion of the import process.

Figure 10A:
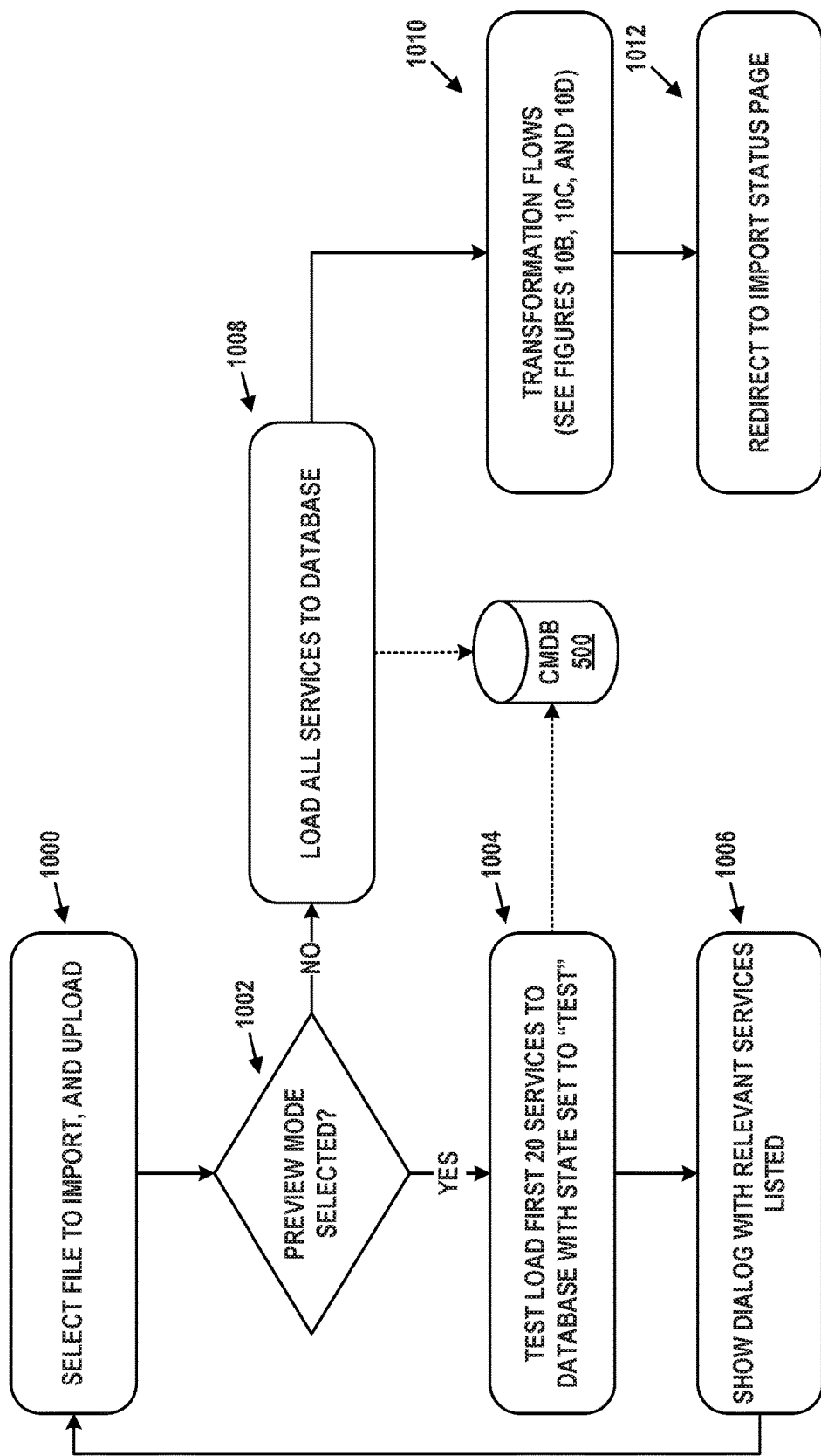
FIGS. 10A, 10B, 10C, and 10D depict a service import procedure, in accordance with example embodiments.
Figure 10B:
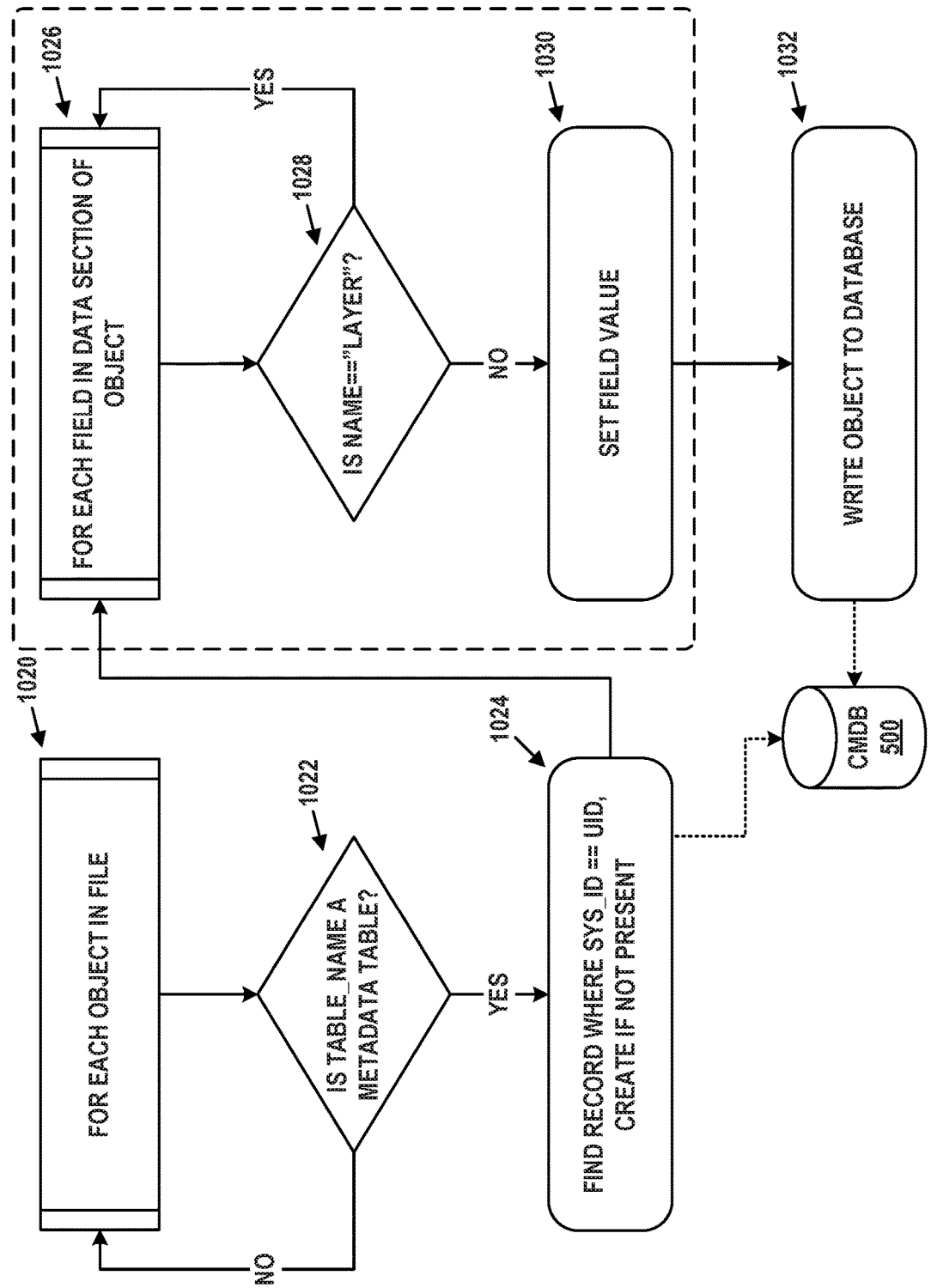

FIG. 10B depicts an example process for importing the metadata of services from the file. Step 1020 indicates that steps 1022, 1024, 1026, 1028, 1030, and 1032 are performed for each object in the file.

At step 1022, the production instance determines whether the table name of the current object is a metadata table. If not, then the object is not a metadata object, and the next object is considered.

Otherwise, at step 1024, the production instance searches in the identified metadata table for a record with the same unique identifier as the metadata object under consideration. If such a record is found, it is updated with the information from the metadata object under consideration. If it is not found, a new record with the unique identifier is created.

Step 1026 indicates that steps 1028 and 1030 are performed for each field in the data section of the metadata object. At step 1028, the production instance determines whether the field under consideration has a name of "layer". If so, the field is skipped. Otherwise, at step 1030, the value of the field is readied to be written to CMDB 500.

Step 1032 involves writing the metadata object and its non-skipped fields to CMDB 500. In some embodiments, various components of the metadata object may be written to various tables in CMDB 500 and/or other databases.

Figure 10C:
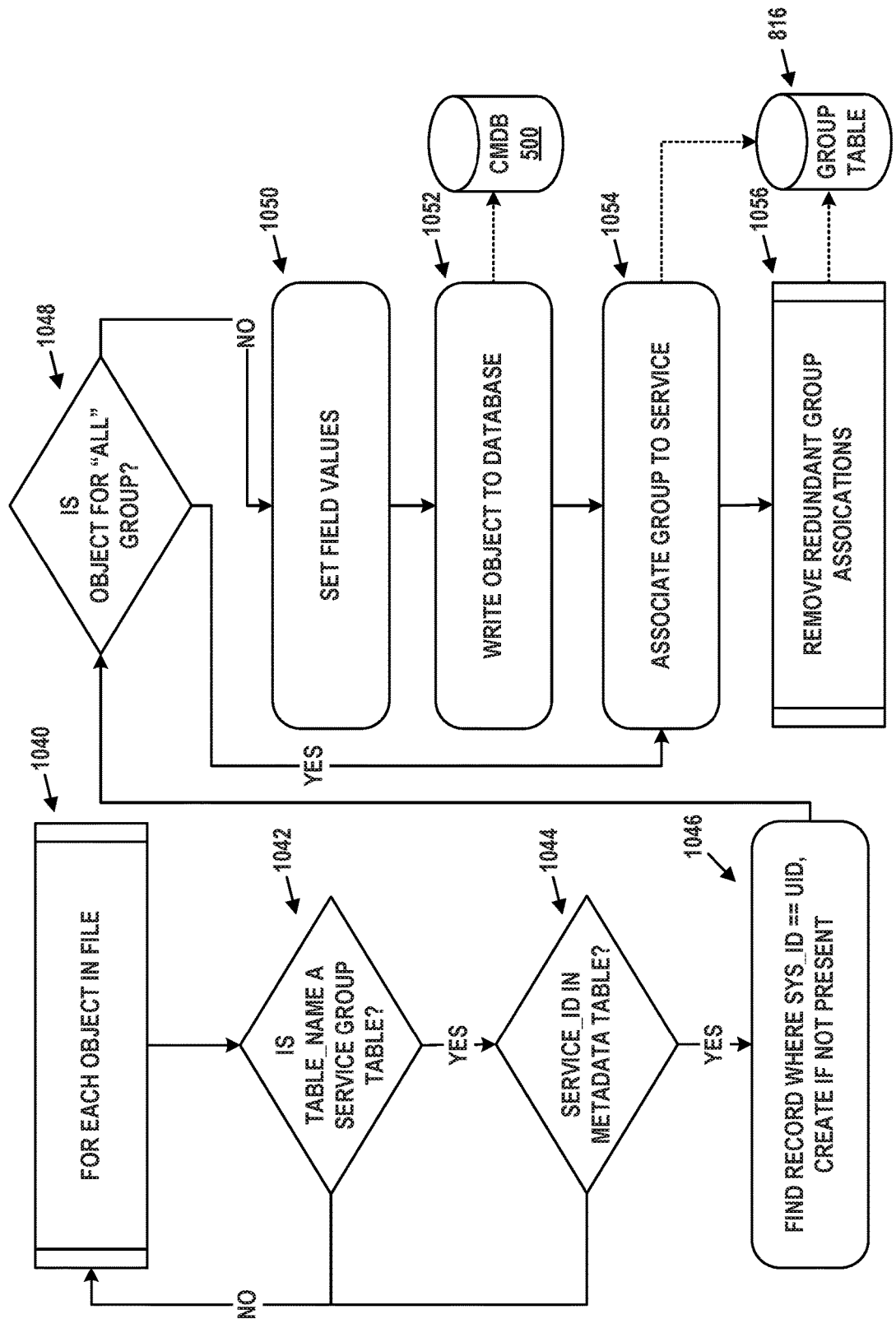

FIG. 10C depicts an example process for importing the service groups of services from the file. Step 1040 indicates that steps 1042, 1044, 1046, 1048, 1050, 1052, and 1054 are performed for each object in the file.

At step 1042, the production instance determines whether the table name of the current object is a service group table. If not, then the object is not a service group object, and the next object is considered.

Otherwise, at step 1044, the production instance determines whether the service identifier of the service group object under consideration is in the metadata table. If not, then the service group is not associated with any of the services being imported, and the next object is considered.

Otherwise, at step 1046, the production instance searches in the identified service group table for a record with the same unique identifier as the service group object under consideration. If such a record is found, it is updated with the information from the service group object under consideration. If it is not found, a new record with the unique identifier is created.

At step 1048, the production instance determines whether the service group under consideration has a name of "ALL". If so, this group represents the ultimate parent in the hierarchy of service groups, and step 1054 is performed.

Otherwise, at step 1050, field values are prepared for writing to CMDB 500, and at step 1052 the service group is written to CMDB 500. At step 1054, the production instance associates the service group to the service being considered, and writes this association as a mapping to group table 816. At step 1056, the production instance removes redundant group associations from group table 816.

In some embodiments, various components of the service group object may be written to various tables in CMDB 500, group table 816, and/or other databases.

Figure 10D:
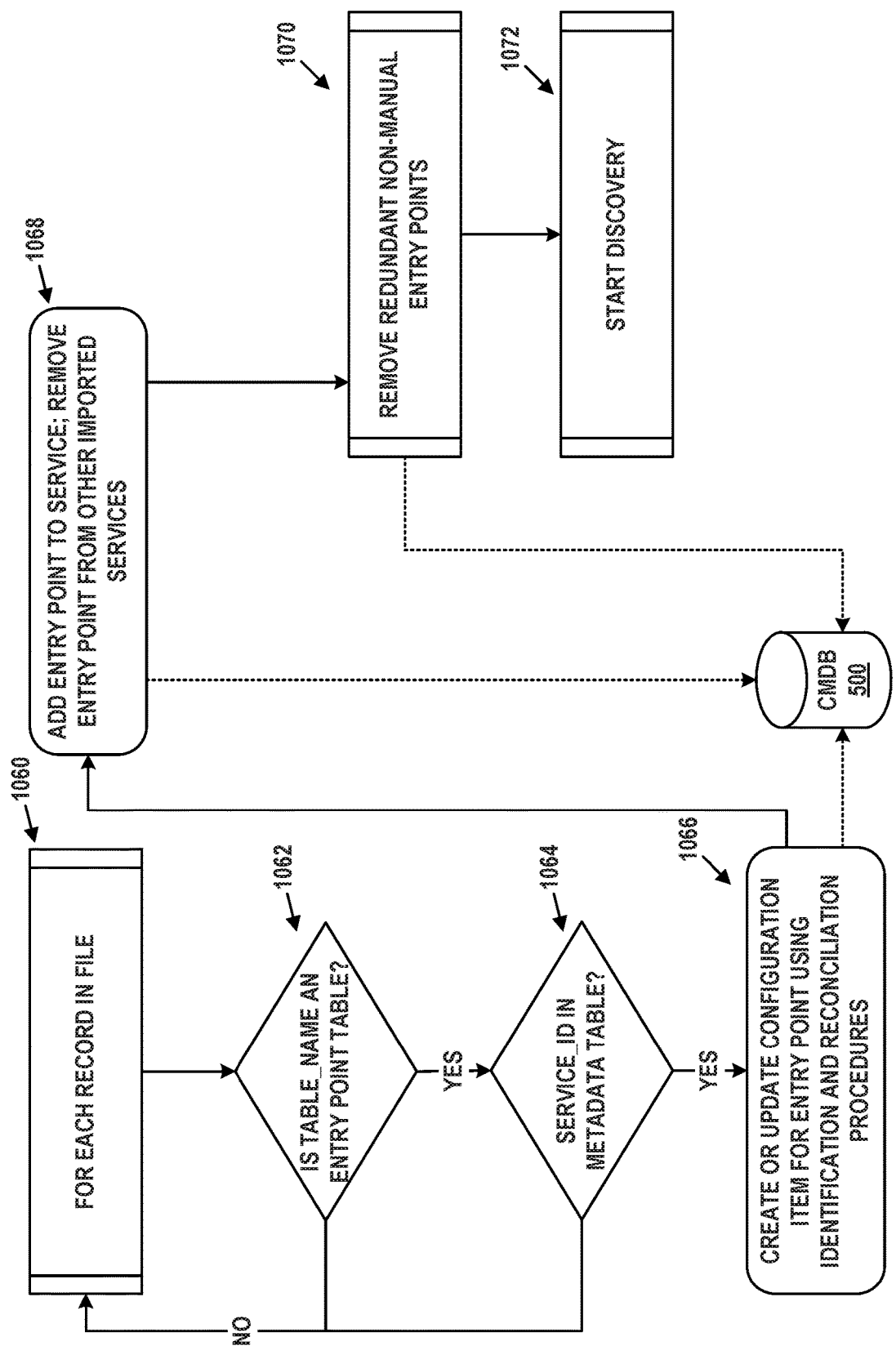

FIG. 10D depicts an example process for importing the entry points of services from the file. Step 1060 indicates that steps 1062, 1064, 1066, and 1068 are performed for each object in the file.

At step 1062, the production instance determines whether the table name of the current object is an entry point table. If not, then the object is not an entry point object, and the next object is considered.

Otherwise, at step 1064, the production instance determines whether the service identifier of the entry point object under consideration is in the metadata table. If not, then the entry point is not associated with any of the services being imported, and the next object is considered.

Otherwise, at step 1066, either a configuration item for the entry point is updated (if it already exists) or created (if it does not exist) in CMDB 500. This may involve using CMDB identification and reconciliation procedures.

At step 1068, the entry point object under consideration is added to the service and possible removed from any other services. This ensures that there is a unique entry point per service.

At step 1070, the production instance may remove any redundant non-manual entry points from CMDB 500.

At step 1072, the production instance may automatically initiate discovery on the newly-imported services. For example the production instance may perform top-down discovery on the URLs or other network addresses associated with each of the entry points.

Notably, by omitting some of the configuration items that appear in the service map from the stored representation, storage space and computational requirements are reduced. The discovery process performed at step 1072 may serve to discover these configuration items and recreate the service maps.

VIII. Example Operations

Figure 11:
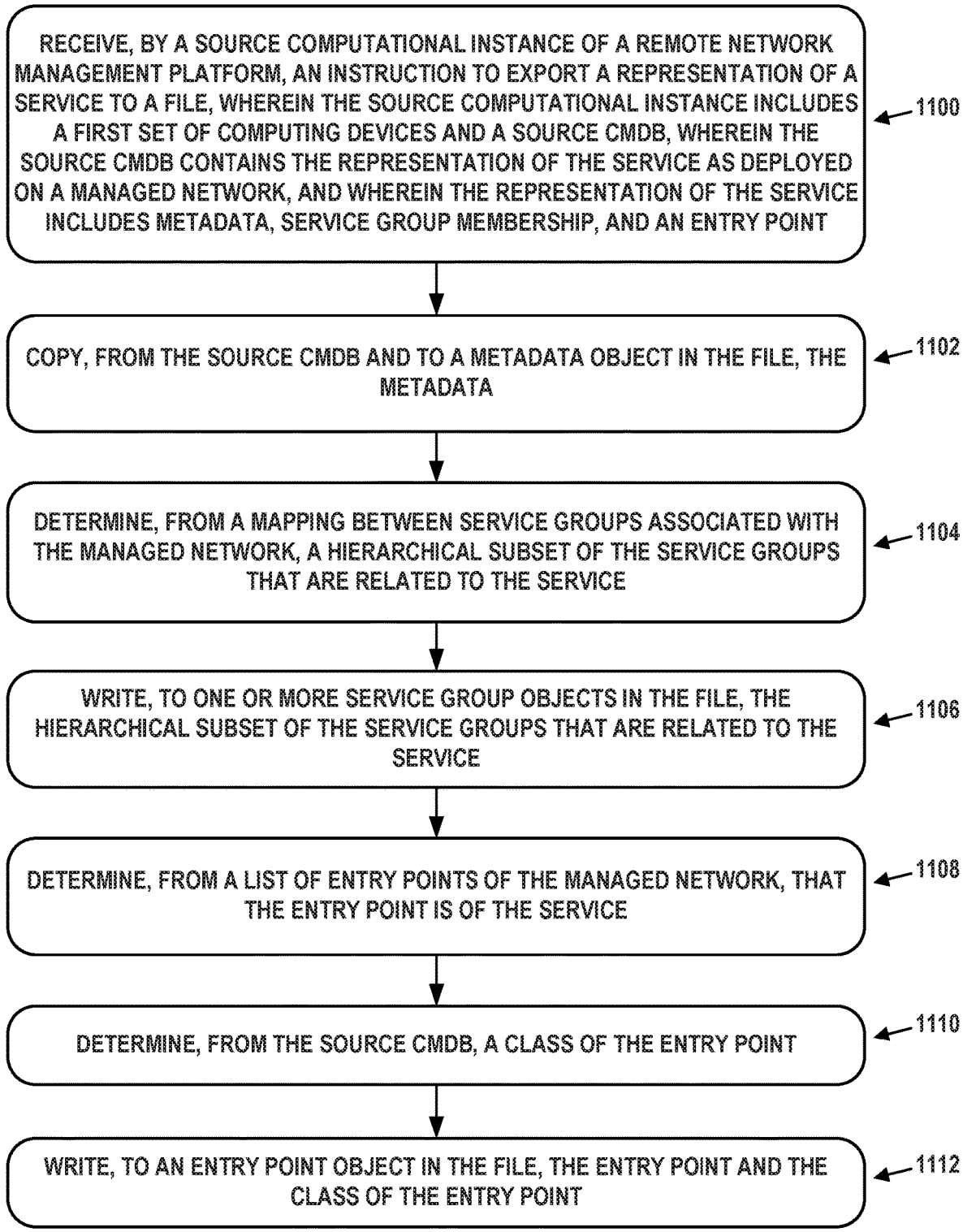
FIG. 11 is a flow chart, in accordance with example embodiments.
Figure 12:
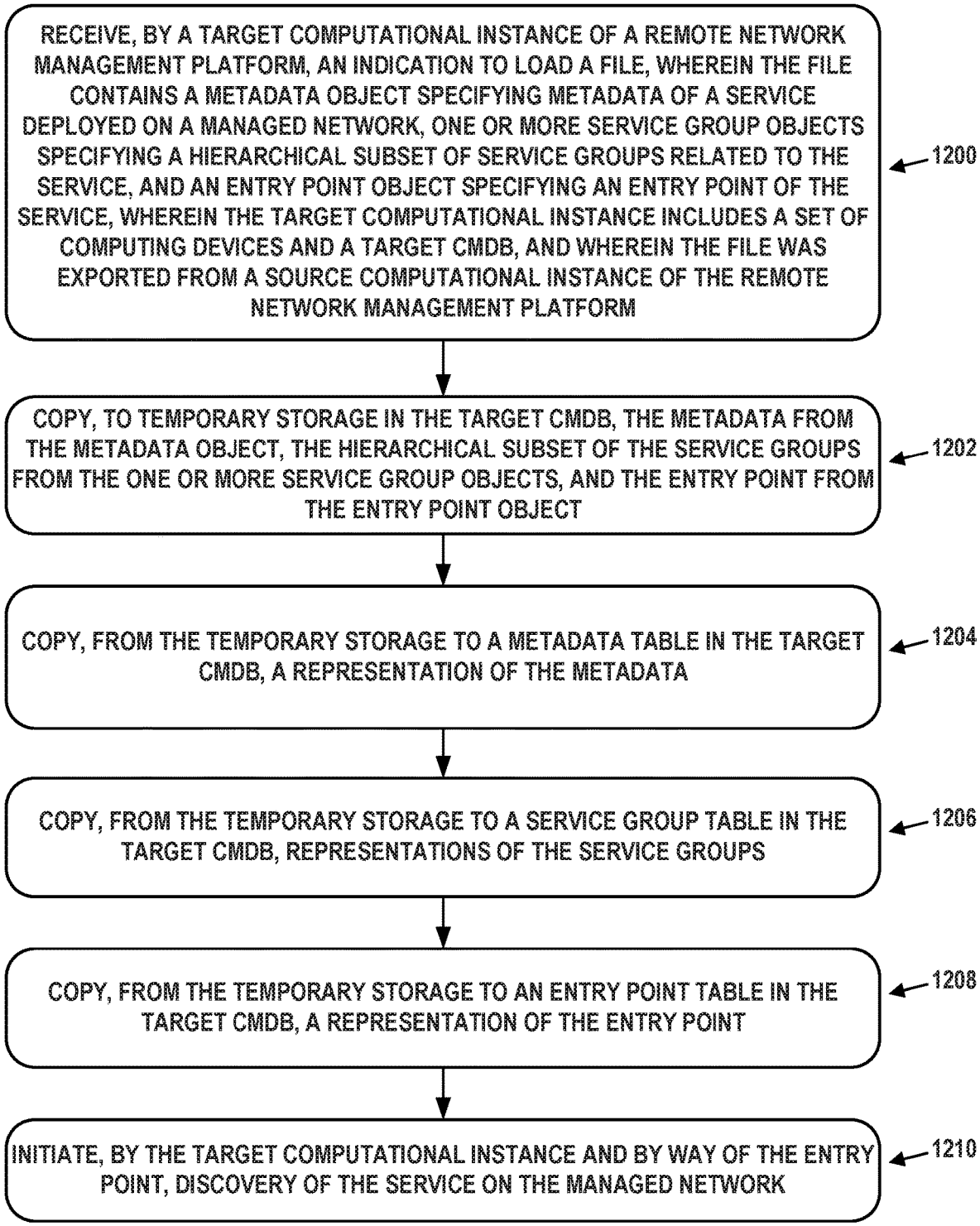
FIG. 12 is a flow chart, in accordance with example embodiments.

FIGS. 11 and 12 are flow charts illustrating example embodiments. The processes illustrated by FIGS. 11 and 12 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIGS. 11 and 12 may be simplified by the removal of any one or more of the features shown therein. Further, these embodiments may be combined with features, aspects, and/or implementations of any of the previous figures or otherwise described herein.

Block 1100 of FIG. 11 may involve receiving, by a source computational instance of a remote network management platform, an instruction to export a representation of a service to a file, wherein the source computational instance includes a first set of computing devices and a source CMDB, wherein the source CMDB contains the representation of the service as deployed on a managed network, and wherein the representation of the service includes metadata, service group membership, and an entry point.

Block 1102 may involve copying, from the source CMDB and to a metadata object in the file, the metadata.

Block 1104 may involve determining, from a mapping between service groups associated with the managed network, a hierarchical subset of the service groups that are related to the service.

Block 1106 may involve writing, to one or more service group objects in the file, the hierarchical subset of the service groups that are related to the service.

Block 1108 may involve determining, from a list of entry points of the managed network, that the entry point is of the service.

Block 1110 may involve determining, from the source CMDB, a class of the entry point.

Block 1112 may involve writing, to an entry point object in the file, the entry point and the class of the entry point.

In some embodiments, each of the metadata, the hierarchical subset of the service groups, and the entry point are associated with data fields, wherein a subset of the data fields are blacklisted, and wherein the source computational instance is further configured to omit writing, to the file, the data fields that are blacklisted.

In some embodiments, each of the metadata, the hierarchical subset of the service groups, and the entry point are associated with data fields, wherein a subset of the data fields are empty, and wherein the source computational instance is further configured to omit writing, to the file, the data fields that are empty.

In some embodiments, the metadata object includes a name of the service, a unique identifier of the service, and a reference to a service table in the source CMDB in which the metadata is stored.

In some embodiments, the hierarchical subset of the service groups includes a first service group, wherein the one or more service group objects includes a first service group object associating the service with the first service group, and wherein the first service group object includes a name of the first service group, the name of the service, a unique identifier of the first service group, the unique identifier of the service, and a reference to a group table in the source CMDB in which the mapping between service groups is stored.

In some embodiments, the hierarchical subset of the service groups also includes a second service group, wherein the one or more service group objects includes a second service group object, wherein the second service group object includes a name of the second service group and a unique identifier of the second service group, and the reference to the group table in the source CMDB in which the mapping between service groups is stored, and wherein the first service group object also includes the unique identifier of the second service group.

In some embodiments, the entry point object includes a name of the entry point, a unique identifier of the entry point, a network address of the entry point, the unique identifier of the service, and a reference to an entry point table in the source CMDB in which the list of entry points is stored.

In some embodiments, the hierarchical subset of the service groups that are related to the service includes a first service group of which the service is a member, and a second service group of which the first service group is a member.

In some embodiments, the remote network management platform further comprises a target computational instance including a second set of computing devices and a target CMDB. The target computational instance may be configured to: receive an indication to load the file; copy, to temporary storage in the target CMDB, the metadata from the metadata object, the hierarchical subset of the service groups from the one or more service group objects, and the entry point and the class of the entry point from the entry point object; copy, from the temporary storage to a metadata table in the target CMDB, a representation of the metadata; copy, from the temporary storage to a service group table in the target CMDB, representations of the service groups; copy, from the temporary storage to an entry point table in the target CMDB, a representation of the entry point and the class of the entry point; and initiate, by way of the entry point, discovery of the service on the managed network.

In some embodiments, copying the representation of the metadata comprises: determining that there is no existing record for the metadata in the target CMDB; and creating a new record for the metadata in the target CMDB.

In some embodiments, copying representations of the hierarchical subset of the service groups comprises: determining that there is no existing record in the target CMDB for a particular service group of the service groups; and creating a new record for the particular service group in the target CMDB.

In some embodiments, copying the representation of the entry point comprises: determining that there is no existing record in the target CMDB for the entry point; and creating a new record for the entry point in the target CMDB.

Block 1200 of FIG. 12 may involve receiving, by a target computational instance of a remote network management platform, an indication to load a file, wherein the file contains a metadata object specifying metadata of a service deployed on a managed network, one or more service group objects specifying a hierarchical subset of service groups related to the service, and an entry point object specifying an entry point of the service, wherein the target computational instance includes a set of computing devices and a target CMDB, and wherein the file was exported from a source computational instance of the remote network management platform.

Block 1202 may involve copying, to temporary storage in the target CMDB, the metadata from the metadata object, the hierarchical subset of the service groups from the one or more service group objects, and the entry point from the entry point object.

Block 1204 may involve copying, from the temporary storage to a metadata table in the target CMDB, a representation of the metadata.

Block 1206 may involve copying, from the temporary storage to a service group table in the target CMDB, representations of the service groups.

Block 1208 may involve copying, from the temporary storage to an entry point table in the target CMDB, a representation of the entry point.

Block 1210 may involve initiating, by the target computational instance and by way of the entry point, discovery of the service on the managed network.

The embodiment of FIG. 12 may be combined with any of the features discussed herein, such as the features discussed in the context of FIG. 11. However, the embodiment of FIG. 12 may be employed independently of any other embodiments or features.

IX. Example Monitor Service Toggle Feature

There may be various ways of displaying service maps by way of a GUI. For example, a service mapping mode may display service maps in the format depicted in FIG. 6, whereas an event management mode may allow users to view alerts for services and/or configuration items related to a service map, apply alert action rules, and prioritize alerts for remediation and root cause analysis.

In prior implementations of GUIs on computational instances, users that opened a service map in service mapping mode had to follow the full path using a navigation pane to view the same map in event management mode. This would involve manually entering a long URL or clicking through several web pages on the GUI.

A new feature allows a quick "hop" from a service map in service mapping mode to the service map in event management mode. Thus, users with permission to both view service maps in event management mode and edit maps in service mapping mode are provided with a button or other GUI element that allows them to quickly navigate between these modes.

In event management mode, an "Edit Service" button may appear on the GUI that leads to service mapping mode, and in service mapping mode a "Monitor Service" button may appear on the GUI that leads back to event management mode. Once such navigation between modes completes, the user may also activate a "Back" button from either of the GUIs to return to the previous GUI.

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A remote network management platform comprising:
a source computational instance including a first set of computing devices and a source configuration management database (CMDB), wherein the source CMDB contains a representation of a service deployed on a managed network, wherein the representation of the service includes metadata, service group membership, and an entry point, and wherein the source computational instance is configured to:
receive an instruction to export the representation of the service to a file;
copy, from the source CMDB and to a metadata object in the file, the metadata;
determine, from a mapping between service groups associated with the managed network, a hierarchical subset of the service groups that are related to the service;
write, to one or more service group objects in the file, the hierarchical subset of the service groups;
determine, from a list of entry points of the managed network, that the entry point is of the service;
determine, from the source CMDB, a class of the entry point; and
write, to an entry point object in the file, the entry point and the class of the entry point.

2. The remote network management platform of claim 1, wherein each of the metadata, the hierarchical subset of the service groups, and the entry point are associated with data fields, wherein a subset of the data fields are blacklisted, and wherein the source computational instance is further configured to omit writing, to the file, the data fields that are blacklisted.

3. The remote network management platform of claim 1, wherein each of the metadata, the hierarchical subset of the service groups, and the entry point are associated with data fields, wherein a subset of the data fields are empty, and wherein the source computational instance is further configured to omit writing, to the file, the data fields that are empty.

4. The remote network management platform of claim 1, wherein the metadata object includes a name of the service, a unique identifier of the service, and a reference to a service table in the source CMDB in which the metadata is stored.

5. The remote network management platform of claim 4, wherein the hierarchical subset of the service groups includes a first service group, wherein the one or more service group objects includes a first service group object associating the service with the first service group, and wherein the first service group object includes a name of the first service group, the name of the service, a unique identifier of the first service group, the unique identifier of the service, and a reference to a group table in the source CMDB in which the mapping between service groups is stored.

6. The remote network management platform of claim 5, wherein the hierarchical subset of the service groups also includes a second service group, wherein the one or more service group objects includes a second service group object, wherein the second service group object includes a name of the second service group and a unique identifier of the second service group, and the reference to the group table in the source CMDB in which the mapping between service groups is stored, and wherein the first service group object also includes the unique identifier of the second service group.

7. The remote network management platform of claim 4, wherein the entry point object includes a name of the entry point, a unique identifier of the entry point, a network address of the entry point, the unique identifier of the service, and a reference to an entry point table in the source CMDB in which the list of entry points is stored.

8. The remote network management platform of claim 1, wherein the hierarchical subset of the service groups that are related to the service includes a first service group of which the service is a member, and a second service group of which the first service group is a member.

9. The remote network management platform of claim 1, further comprising:
a target computational instance including a second set of computing devices and a target CMDB, wherein the target computational instance is configured to:
receive an indication to load the file;
copy, to temporary storage in the target CMDB, the metadata from the metadata object, the hierarchical subset of the service groups from the one or more service group objects, and the entry point and the class of the entry point from the entry point object;
copy, from the temporary storage to a metadata table in the target CMDB, a representation of the metadata;
copy, from the temporary storage to a service group table in the target CMDB, representations of the service groups;
copy, from the temporary storage to an entry point table in the target CMDB, a representation of the entry point and the class of the entry point; and
initiate, by way of the entry point, discovery of the service on the managed network.

10. The remote network management platform of claim 9, wherein copying the representation of the metadata comprises:
determining that there is no existing record for the metadata in the target CMDB; and
creating a new record for the metadata in the target CMDB.

11. The remote network management platform of claim 9, wherein copying representations of the hierarchical subset of the service groups comprises:
determining that there is no existing record in the target CMDB for a particular service group of the service groups; and
creating a new record for the particular service group in the target CMDB.

12. The remote network management platform of claim 9, wherein copying the representation of the entry point comprises:
determining that there is no existing record in the target CMDB for the entry point; and creating a new record for the entry point in the target CMDB.

13. A computer-implemented method comprising:

receiving, by a source computational instance of a remote network management platform, an instruction to export a representation of a service to a file, wherein the source computational instance includes a first set of computing devices and a source configuration management database (CMDB), wherein the source CMDB contains the representation of the service as deployed on a managed network, and wherein the representation of the service includes metadata, service group membership, and an entry point;

copying, from the source CMDB and to a metadata object in the file, the metadata;

determining, from a mapping between service groups associated with the managed network, a hierarchical subset of the service groups that are related to the service;

writing, to one or more service group objects in the file, the hierarchical subset of the service groups that are related to the service;

determining, from a list of entry points of the managed network, that the entry point is of the service;

determining, from the source CMDB, a class of the entry point; and writing, to an entry point object in the file, the entry point and the class of the entry point.

14. The computer-implemented method of claim 13, wherein the metadata object includes a name of the service, a unique identifier of the service, and a reference to a service table in the source CMDB in which the metadata is stored.

15. The computer-implemented method of claim 14, wherein the hierarchical subset of the service groups includes a first service group, wherein the one or more service group objects includes a first service group object associating the service with the first service group, and wherein the first service group object includes a name of the first service group, the name of the service, a unique identifier of the first service group, the unique identifier of the service, and a reference to a group table in the source CMDB in which the mapping between service groups is stored.

16. The computer-implemented method of claim 15, wherein the hierarchical subset of the service groups also includes a second service group, wherein the one or more service group objects includes a second service group object, wherein the second service group object includes a name of the second service group and a unique identifier of the second service group, and the reference to the group table in the source CMDB in which the mapping between service groups is stored, and wherein the first service group object also includes the unique identifier of the second service group.

17. The computer-implemented method of claim 15, wherein the entry point object includes a name of the entry point, a unique identifier of the entry point, a network address of the entry point, the unique identifier of the service, and a reference to an entry point table in the source CMDB in which the list of entry points is stored.

18. The computer-implemented method of claim 13, wherein the hierarchical subset of the service groups that are related to the service includes a first service group of which the service is a member, and a second service group of which the first service group is a member.

19. The computer-implemented method of claim 13, wherein the remote network management platform also contains a target computational instance including a second set of computing devices and a target CMDB, the computer-implemented method further comprising:

receiving, by the target computational instance, an indication to load the file;

copying, to temporary storage in the target CMDB, the metadata from the metadata object, the hierarchical subset of the service groups from the one or more service group objects, and the entry point and the class of the entry point from the entry point object;

copying, from the temporary storage to a metadata table in the target CMDB, a representation of the metadata;

copying, from the temporary storage to a service group table in the target CMDB, representations of the service groups;

copying, from the temporary storage to an entry point table in the target CMDB, a representation of the entry point and the class of the entry point; and initiating, by the target computational instance and by way of the entry point, discovery of the service on the managed network.

20. A computer-implemented method comprising:

receiving, by a target computational instance of a remote network management platform, an indication to load a file, wherein the file contains a metadata object specifying metadata of a service deployed on a managed network, one or more service group objects specifying a hierarchical subset of service groups related to the service, and an entry point object specifying an entry point of the service, wherein the target computational instance includes a set of computing devices and a target configuration management database (CMDB), and wherein the file was exported from a source computational instance of the remote network management platform;

copying, to temporary storage in the target CMDB, the metadata from the metadata object, the hierarchical subset of the service groups from the one or more service group objects, and the entry point from the entry point object;

copying, from the temporary storage to a metadata table in the target CMDB, a representation of the metadata;

copying, from the temporary storage to a service group table in the target CMDB, representations of the service groups;

copying, from the temporary storage to an entry point table in the target CMDB, a representation of the entry point; and initiating, by the target computational instance and by way of the entry point, discovery of the service on the managed network.

* * * * *